(12) United States Patent  
Han

(10) Patent No.: US 11,823,020 B2
(45) Date of Patent: *Nov. 21, 2023

(54) ARTIFICIAL INTELLIGENCE APPARATUS FOR GENERATING TRAINING DATA FOR ARTIFICIAL INTELLIGENCE MODEL AND METHOD THEREOF

(71) Applicant: LG ELECTRONICS INC., Seoul (KR)

(72) Inventor: Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

This patent is subject to a terminal disclaimer.

(21) Appl. No.: 17/573,179

(22) Filed: Jan. 11, 2022

(65) Prior Publication Data

US 2022/0129703 A1     Apr. 28, 2022

Related U.S. Application Data

(63) Continuation of application No. 16/730,669, filed on Dec. 30, 2019, now Pat. No. 11,295,166.

(30) Foreign Application Priority Data

Dec. 9, 2019    (KR) .................. 10-2019-0162598

(51) Int. Cl.
| | |
|---|---|
| *G06N 20/10* | (2019.01) |
| *G06N 3/08* | (2023.01) |
| *G06N 5/04* | (2023.01) |
| *G06F 18/214* | (2023.01) |
| *G06N 3/045* | (2023.01) |
| *G06V 10/764* | (2022.01) |

(52) U.S. Cl.
CPC .......... *G06N 20/10* (2019.01); *G06F 18/214* (2023.01); *G06N 3/045* (2023.01); *G06N 3/08* (2013.01); *G06N 5/04* (2013.01); *G06V 10/764* (2022.01)

(58) Field of Classification Search
CPC .......... G06N 20/10; G06N 3/045; G06N 3/08; G06N 5/04; G06N 5/022; G06N 5/025; G06F 18/214; G06V 10/764
USPC ...................................................... 382/159
See application file for complete search history.

(56) References Cited

U.S. PATENT DOCUMENTS

| | | |
|---|---|---|
| 5,294,873 A | 3/1994 | Seraji |
| 10,452,897 B1 | 10/2019 | Benkreira et al. |

(Continued)

OTHER PUBLICATIONS

U.S. Appl. No. 16/730,669, Office Action dated Aug. 19, 2021, 15 pages.

*Primary Examiner* — Juan A Torres
(74) *Attorney, Agent, or Firm* — LEE, HONG, DEGERMAN, KANG & WAIMEY PC

(57) ABSTRACT

An embodiment of the present disclosure provides an artificial intelligence apparatus for generating training data including a memory configured to store an artificial intelligence model, an input interface including a microphone or a camera, and a processor configured to receive, via the input interface, input data, generate an inference result corresponding to the input data by using the artificial intelligence model, receive feedback corresponding to the inference result, determine suitability of the input data and the feedback for updating the artificial intelligence model, and generate training data based on the input data and the feedback if the input data and the feedback are determined as data suitable for updating of the artificial intelligence model.

13 Claims, 21 Drawing Sheets

(56) References Cited

U.S. PATENT DOCUMENTS

| | | |
|---|---|---|
| 2005/0131589 A1 | 6/2005 | Yamamura et al. |
| 2005/0240620 A1 | 10/2005 | Danner et al. |
| 2009/0060293 A1 | 3/2009 | Nagao et al. |
| 2013/0227352 A1 | 8/2013 | Kumarasamy et al. |
| 2014/0372401 A1 | 12/2014 | Goldstein et al. |
| 2016/0071517 A1 | 3/2016 | Beaver et al. |
| 2018/0286401 A1 | 10/2018 | Oh et al. |
| 2019/0297381 A1 | 9/2019 | Chung et al. |
| 2019/0370587 A1 | 12/2019 | Burachas et al. |
| 2020/0234085 A1 | 7/2020 | Jeon |
| 2020/0335095 A1 | 10/2020 | Yuan et al. |
| 2021/0174142 A1 | 6/2021 | Han |

FIG. 19
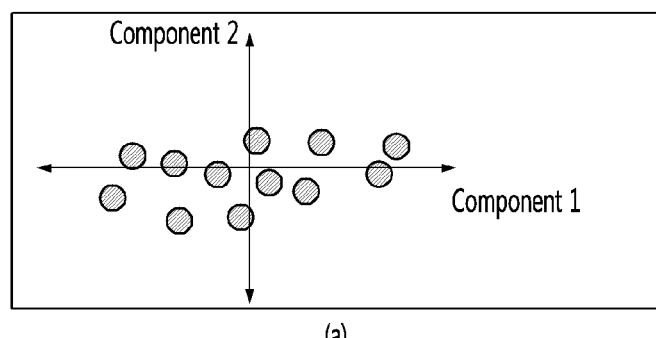
(a)
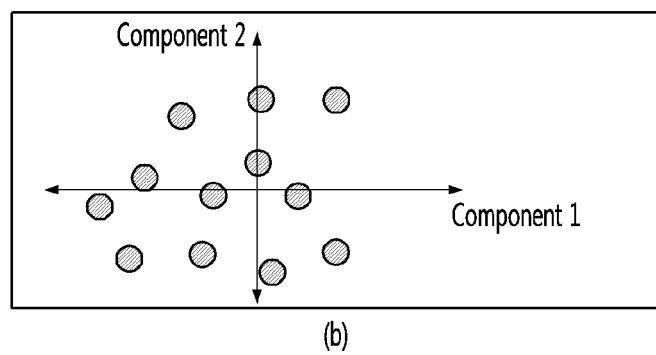
(b)

ARTIFICIAL INTELLIGENCE APPARATUS FOR GENERATING TRAINING DATA FOR ARTIFICIAL INTELLIGENCE MODEL AND METHOD THEREOF

CROSS-REFERENCE TO RELATED APPLICATIONS

This application is a continuation of U.S. patent application Ser. No. 16/730,669, filed on Dec. 30, 2019, which claims the benefit of earlier filing date and right of priority to Korean Patent Application No. 10-2019-0162598, filed on Dec. 9, 2019, the contents of which are all hereby incorporated by reference herein their entirety.

BACKGROUND

The present disclosure relates to an artificial intelligence apparatus for generating training data for an artificial intelligence model by selecting data suitable for training an artificial intelligence model among collected data and a method thereof.

Recently, many artificial intelligence evolution techniques have been adopted to continuously update the artificial intelligence model to reflect usage logs of users. When the artificial intelligence model is updated based on the usage logs of the real users, since training data suitable for the usage aspects of the real users can be obtained, there is an advantage that a more realistic and useful artificial intelligence model can be configured.

Artificial intelligence evolution technology based on the user's usage log basically requires the assumption that the user provides normal feedback through normal use. If a user accidentally or intentionally provides wrong feedback, the artificial intelligence model may be updated based on a wrong usage log, which may cause the artificial intelligence model to be incorrectly learned.

Therefore, there is a need for a method for selectively generating training data by determining whether the collected usage logs are suitable for updating the artificial intelligence model.

SUMMARY

The present disclosure provides an artificial intelligence apparatus which determines whether input data and feedback corresponding thereto are data suitable for updating an artificial intelligence model and generates training data based on data suitable for the artificial intelligence model, and a method thereof.

An embodiment of the present disclosure provides an artificial intelligence apparatus which generates an inference result for input data using an artificial intelligence model, receives feedback corresponding to the inference result, determines whether the input data and the feedback are suitable for updating the artificial intelligence model, and generates input data and feedback determined to be suitable for updating an artificial intelligence model as training data, and a method thereof.

In addition, an embodiment of the present disclosure provides an artificial intelligence apparatus which determines suitability of the input data and the feedback by using a plurality of suitability determination methods and determines whether the input data and the feedback are suitable for updating the artificial intelligence model based on the suitability ratio for the plurality of suitability determination results, and a method thereof.

In addition, an embodiment of the present disclosure provides an artificial intelligence apparatus which determines whether input data and feedback are suitable for updating an artificial intelligence model by determining whether input data is an outlier as a first suitability determination method, and a method thereof.

In addition, an embodiment of the present disclosure provides an artificial intelligence apparatus which calculates a sensitivity of an artificial intelligence model for input data as a second suitability determination method and determines whether input data and feedback are suitable for updating the artificial intelligence model in consideration of the calculated sensitivity, and a method thereof.

In addition, an embodiment of the present disclosure provides an artificial intelligence apparatus which generates a plurality of temporary inference results for input data using an artificial intelligence model as a third suitability determination method and compares ensemble inference results generated from the plurality of temporary inference results and feedback with each other to determine whether input data and feedback are suitable for updating an artificial intelligence model, and a method thereof.

In addition, an embodiment of the present disclosure provides an artificial intelligence apparatus which calculates a kernel score in a class corresponding to feedback through kernel analysis as a fourth suitability determination method and determines whether input data and feedback are suitable for updating the artificial intelligence model in consideration of the calculated kernel score, and a method thereof.

BRIEF DESCRIPTION OF THE DRAWINGS

FIGS. 18 and 19 are views illustrating kernel analysis according to an embodiment of the present disclosure.

DETAILED DESCRIPTION OF THE EMBODIMENTS

Figure 1:
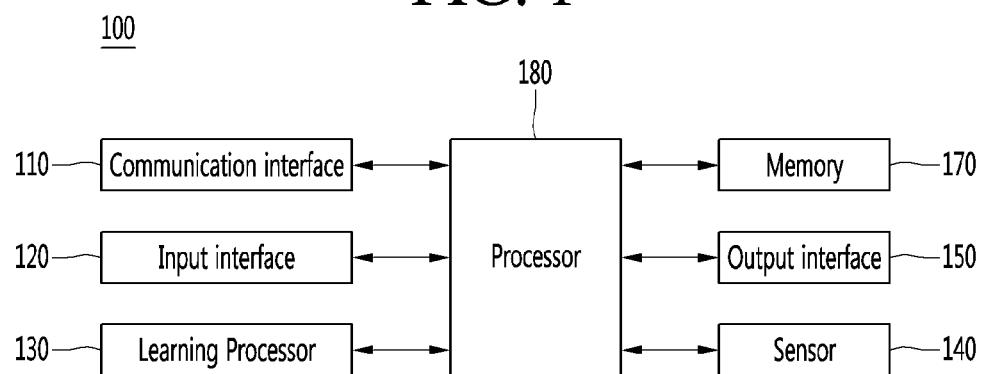
FIG. 1 is a block diagram illustrating an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues.

Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a traveling actuator including an actuator or a motor and may perform various physical operations such as moving a robot joint. In addition, a movable robot may include a wheel, a brake, a propeller, and the like in a traveling actuator, and may travel on the ground through the traveling actuator or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present disclosure.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication interface 110, an input interface 120, a learning processor 130, a sensor 140, an output interface 150, a memory 170, and a processor 180.

The communication interface 110 may transmit and receive data to and from external devices such as other AI apparatuses 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input interface 120 may acquire various kinds of data.

Here, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensor 140 may acquire at least one of internal information about the AI apparatus 100, ambient environment information about the AI apparatus 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

Here, the output interface 150 may include a display for outputting time information, a speaker for outputting auditory information, and a haptic module for outputting haptic information.

The memory 170 may store data that supports various functions of the AI apparatus 100. For example, the memory 170 may store input data acquired by the input interface 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
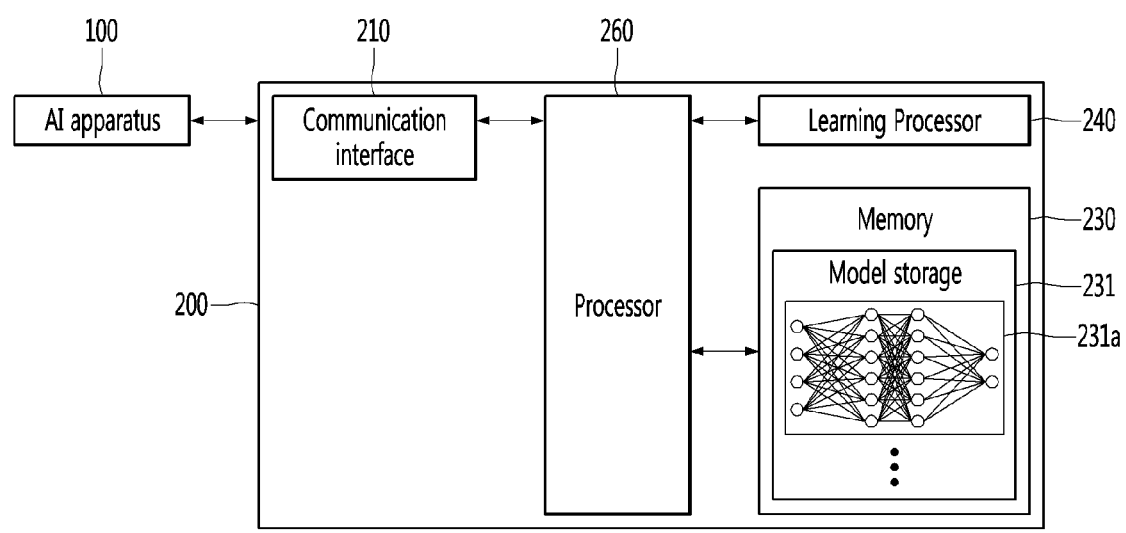
FIG. 2 is a block diagram illustrating an AI server according to an embodiment of the present disclosure.

FIG. 2 is a block diagram illustrating an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication interface 210, a memory 230, a learning processor 240, a processor 260, and the like.

The communication interface 210 can transmit and receive data to and from an external device such as the AI apparatus 100.

The memory 230 may include a model storage 231. The model storage 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
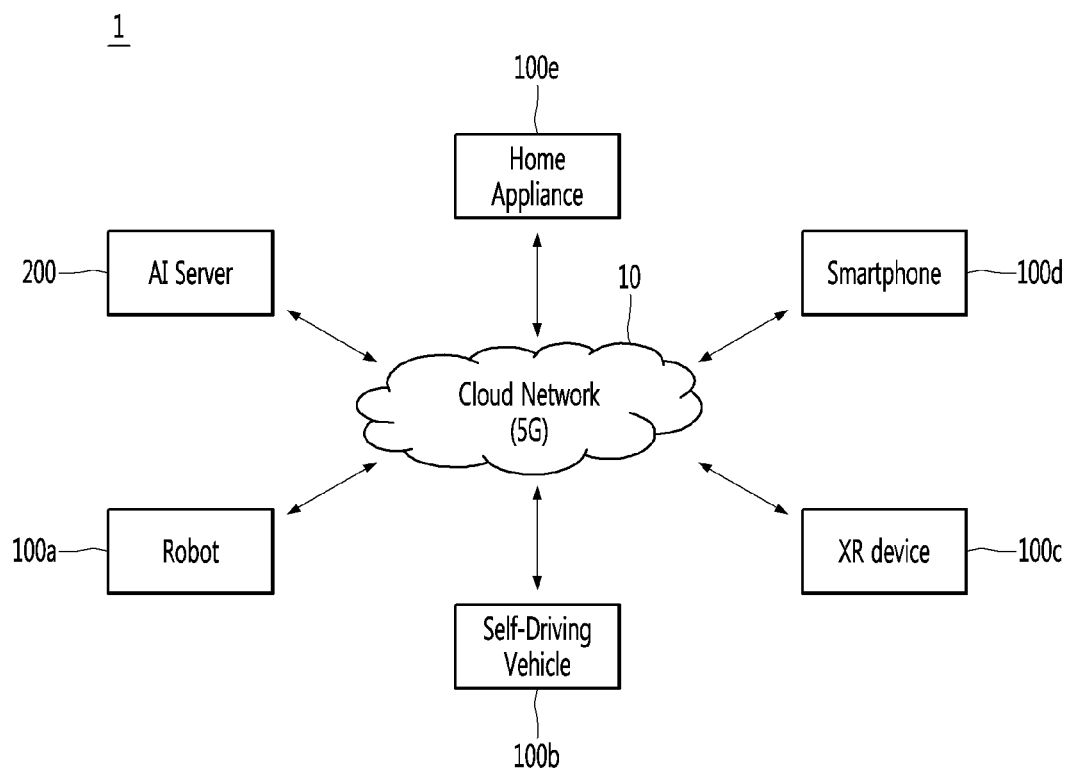
FIG. 3 is a view illustrating an AI system according to an embodiment of the present disclosure.

FIG. 3 is a view illustrating an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

Here, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external device to determine the travel route and the travel plan, and may control the traveling actuator such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the traveling actuator based on the control/interaction of the user. Here, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling route by using the recognized surrounding information or object information. The learning model may be learned directly from the self-driving vehicle 100*a* or may be learned from an external device such as the AI server 200.

Here, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external device to determine the travel route and the travel plan, and may control the traveling actuator such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the traveling actuator based on the control/interaction of the user. Here, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

Here, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the traveling actuator of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
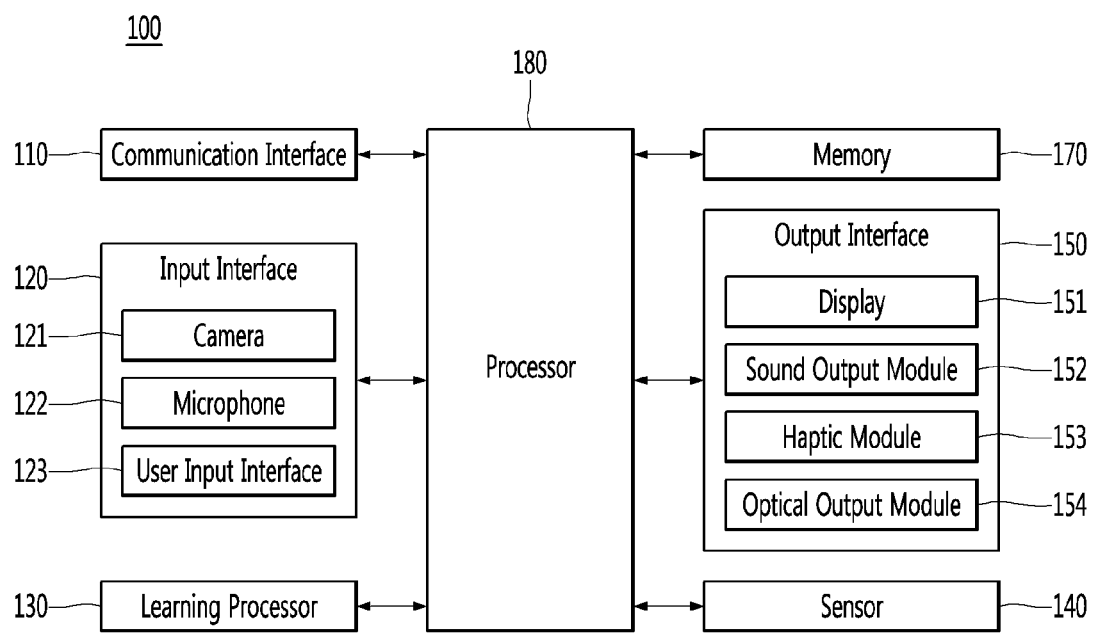
FIG. 4 is a block diagram illustrating an AI apparatus according to an embodiment of the present disclosure.

FIG. 4 is a block diagram illustrating an AI apparatus 100 according to an embodiment of the present disclosure.

The redundant repeat of FIG. 1 will be omitted below.

The communication interface 110 may also be referred to as a communication modem or a communication circuit.

Referring to FIG. 4, the input interface 120 may include a camera 121 for image signal input, a microphone 122 for receiving audio signal input, and a user input interface 123 for receiving information from a user.

Voice data or image data collected by the input interface 120 are analyzed and processed as a user's control command.

Then, the input interface 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input interface 123 is to receive information from a user and when information is inputted through the user input interface 123, the processor 180 may control an operation of the AI apparatus 100 to correspond to the inputted information.

The user input interface 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensor 140 may also be referred to as a sensor module.

The output interface 150 may include at least one of a display 151, a sound output module 152, a haptic module 153, or an optical output module 154.

The display 151 may display (output) information processed in the AI apparatus 100. For example, the display 151 may display execution screen information of an application program running on the AI apparatus 100 or user interface (UI) and graphic user interface (GUI) information according to such execution screen information.

The display 151 may be formed with a mutual layer structure with a touch sensor or formed integrally, so that a touch screen may be implemented. Such a touch screen may serve as the user input interface 123 providing an input interface between the AI apparatus 100 and a user, and an output interface between the AI apparatus 100 and a user at the same time.

The sound output module 152 may output audio data received from the wireless communication interface 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
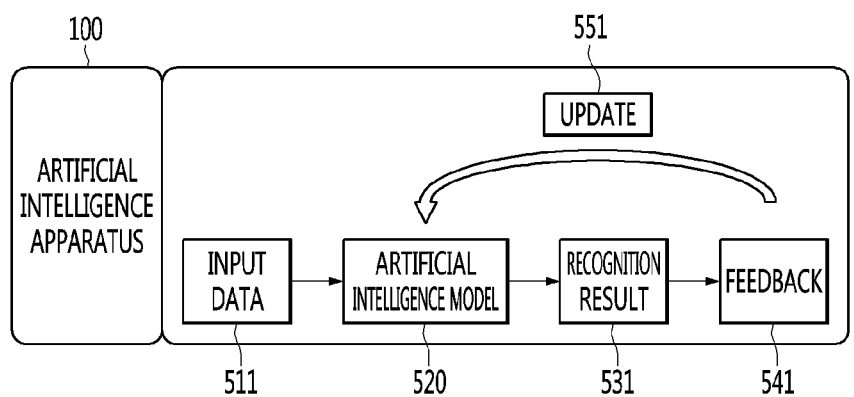
FIG. 5 is a view illustrating an artificial intelligence system for generating training data for an artificial intelligence model according to an embodiment of the present disclosure.

FIG. 5 is a view illustrating an artificial intelligence system 1 for generating training data for an artificial intelligence model, according to an embodiment of the present disclosure.

Referring to FIG. 5, a system 1 for generating training data for an artificial intelligence model may include an artificial intelligence apparatus 100 for generating training data for an artificial intelligence model. Although not illustrated in FIG. 5, the system 1 for generating training data for the artificial intelligence model may further include not only an artificial intelligence apparatus 100, but also an external device (or a terminal) that receives input data 511 or feedback 541, an artificial intelligence server 200 for updating 551 the artificial intelligence model 520, or the like.

If the artificial intelligence apparatus 100 receives the input data 511, the artificial intelligence apparatus 100 may generate a recognition result 531 or an inference result corresponding to the received input data 511 using the artificial intelligence model 520. In addition, the artificial intelligence apparatus 100 may receive the feedback 541 corresponding to the generated recognition result 531, generate training data based on the input data 511 and the received feedback 541 and update 551 the artificial intelligence model 520 using the generated training data.

If the feedback 541 corresponding to the input data 511 accidentally or intentionally points to a wrong recognition result, the artificial intelligence model 520 may be updated unsuitably or incorrectly. However, since the artificial intelligence apparatus 100 stores the artificial intelligence model 520 in the system 1 illustrated in FIG. 5, even if the artificial intelligence model 520 is incorrectly updated, the artificial intelligence model 520 may not adversely affect the artificial intelligence model stored in another artificial intelligence apparatus.

Figure 6:
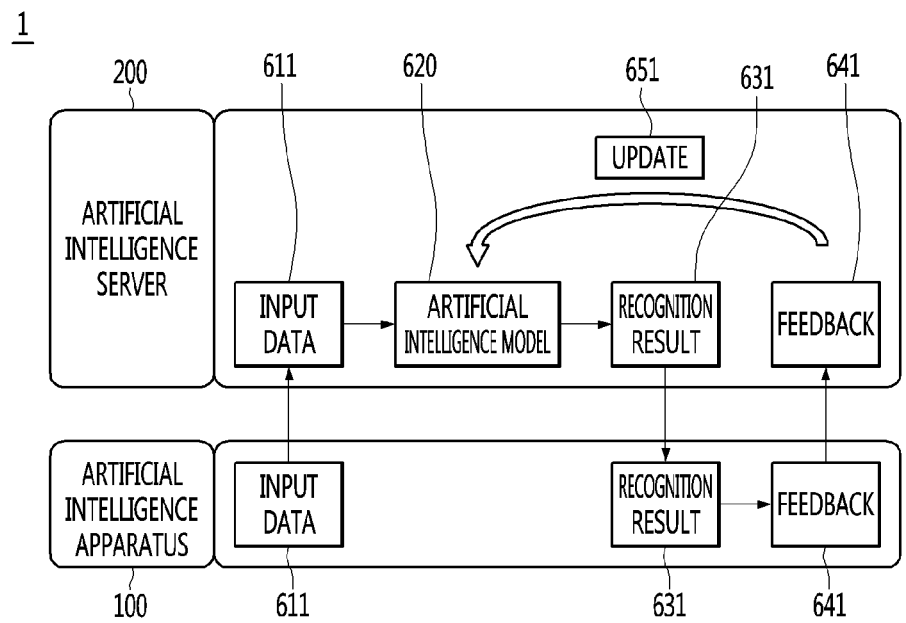
FIG. 6 is a view illustrating an artificial intelligence system for generating training data for an artificial intelligence model according to an embodiment of the present disclosure.

FIG. 6 is a view illustrating an artificial intelligence system 1 for generating training data for an artificial intelligence model, according to an embodiment of the present disclosure.

Referring to FIG. 6, the system 1 for generating training data for an artificial intelligence model may include an artificial intelligence apparatus 100 and an artificial intelligence server 200 for generating training data for an artificial intelligence model. Although not illustrated in FIG. 6, the system 1 for generating training data for an artificial intelligence model may further includes not only an artificial intelligence apparatus 100 and an artificial intelligence server 200, but also an external device (or a terminal) for receiving input data 611 or feedback 641, or the like.

If the artificial intelligence apparatus 100 receives the input data 611, the artificial intelligence apparatus 100 may transmit the received input data 611 to the artificial intelligence server 200. The artificial intelligence server 200 may generate a recognition result 631 or an inference result corresponding to the received input data 611 by using the artificial intelligence model 620 and transmit the generated recognition result 631 to an artificial intelligence apparatus 100. The artificial intelligence apparatus 100 outputs the received recognition result 631, and if the artificial intelligence apparatus 100 receives the feedback 641 corresponding to the recognition result 631, the artificial intelligence apparatus 100 may transmit the received feedback 641 to the artificial intelligence server 200. The artificial intelligence server 200 may generate training data based on the input data 611 and the received feedback 641 and update 651 the artificial intelligence model 620 using the generated training data.

If the feedback 641 corresponding to the input data 611 accidentally or intentionally points to a wrong recognition result, the artificial intelligence model 620 may be updated unsuitably or incorrectly. In particular, since the artificial intelligence server 200 stores the artificial intelligence model 620 in the system 1 illustrated in FIG. 6, if the artificial intelligence model 620 is incorrectly updated, the artificial intelligence model 620 may adversely affect the performance of a plurality of artificial intelligence apparatuses using the same artificial intelligence model 620.

Figure 7:
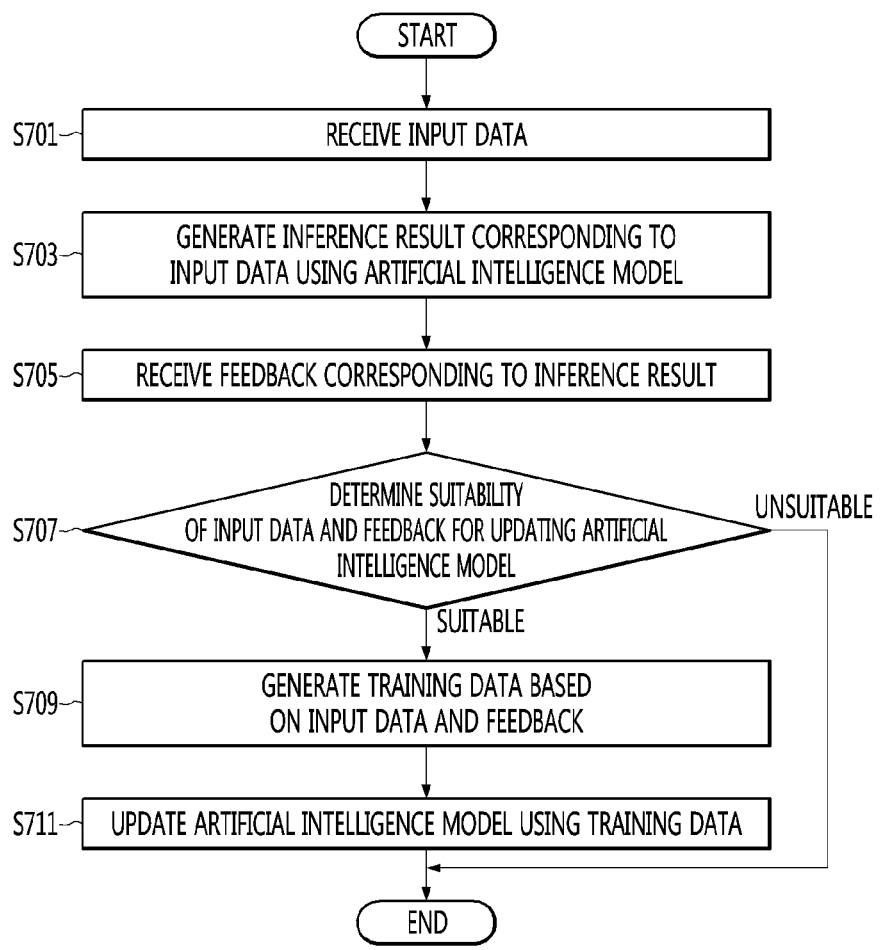
FIG. 7 is a flowchart illustrating a method for generating training data for an artificial intelligence model according to an embodiment of the present disclosure.

FIG. 7 is a flowchart illustrating a method of generating training data for an artificial intelligence model according to an embodiment of the present disclosure.

Referring to FIG. 7, the processor 180 of the artificial intelligence apparatus 100 receives input data (S701).

The processor 180 may receive input data through the camera 121 or the microphone 122 or may receive input data from an external device (not illustrated) through the communication interface 110. The input data may include image data or voice data.

The external device (not illustrated) may mean a device which can generate image data including a camera or an image sensor, generate voice data including a microphone, and may transmit generated image data or generated voice data to another device including the communication interface. For example, an external device (not illustrated) may include an Internet of things cameras, a surveillance camera, a drone, a robot, or the like.

The image data may include at least one of RGB image data, IR image data, or depth image data. For example, the image data according to an embodiment may be RGB-IR image data including RGB information and IR information for each pixel. The image data may include an object to be recognized.

The voice data may include a voice signal of the user. For example, the voice data may be an audio file in various formats such as pulse code modulation (PCM), way, and mp3. The voice data may include a command for controlling the artificial intelligence apparatus 100, a query for searching for information, and the like.

The processor 180 of the artificial intelligence apparatus 100 generates an inference result corresponding to the received input data using the artificial intelligence model (S703).

The artificial intelligence model may mean an image recognition model that generates object recognition information by recognizing an object included in the image data or may mean a voice recognition model that generates intention information by recognizing a user voice included in the voice data.

If the artificial intelligence model is an object recognition model, the processor 180 may generate object recognition information as an inference result using the artificial intelligence model. Similarly, if the artificial intelligence model is a voice recognition model, the processor 180 may generate intention information as a result of inference using the artificial intelligence model.

The processor 180 of the artificial intelligence apparatus 100 may generate an inference result corresponding to the received input data by using an artificial intelligence model stored in the memory 170. Alternatively, the processor 180 of the artificial intelligence apparatus 100 transmits input data received through the communication interface 110 to the artificial intelligence server 200, and the processor 260 of the artificial intelligence server 200 may generate an inference result corresponding to the received input data using the artificial intelligence model stored in the memory 240, and the processor 180 of the artificial intelligence apparatus 100 can receive the inference result generated from the artificial intelligence server 200 through the communication interface 110.

In addition, the processor 180 of the artificial intelligence apparatus 100 receives feedback corresponding to the inference result (S705).

The feedback corresponding to the inference result may include suitability feedback indicating whether the inference result is suitable or unsuitable, or correction feedback that corrects the unsuitable inference result.

The feedback corresponding to the inference result may include explicit feedback by the user's input, implicit feedback by the user's input, and feedback generated from the operation information. Feedback by the user input may be obtained from the uttered voice of the user, the shout or humming of the user, the facial expression of the user, or the gesture of the user, the feedback generated from the operation information may be obtained from the sensor information collected by the sensor unit 140. For example, the artificial intelligence apparatus 100 receives the image data through the camera 121 and obtains an inference result that no obstacle object exists in the front using the artificial intelligence model, and, according to this, although the artificial intelligence apparatus 100 generates a control signal moving forward to control the traveling actuator (not illustrated), if the artificial intelligence apparatus 100 cannot move due to an external factor which is not included in the image data, the artificial intelligence apparatus 100 may obtain feedback that the artificial intelligence apparatus 100 cannot move by an obstacle through the sensor information obtained by the sensor unit 140.

In addition, the processor 180 of the artificial intelligence apparatus 100 determines suitability of input data and feedback for updating the artificial intelligence model (S707).

The suitability of the input data and feedback for updating the artificial intelligence model may mean whether the input data and the feedback corresponding thereto are data suitable for updating the artificial intelligence model.

The artificial intelligence model is learned using a variety of training data, and in particular, it is possible to derive inference results suitable for the actual usage environment, as the artificial intelligence model is learned using training data generated from a user's actual usage log. However, the actual usage log may contain wrong data, and when the usage log containing the wrong data is used to learn the artificial intelligence model may adversely affect the performance of the artificial intelligence model. The actual usage log may include input data and feedback, and the wrong usage log may occur in situations where the user intentionally provides the wrong feedback or provides wrong feedback accidentally. Therefore, it is necessary to determine whether input data and feedback included in the actual usage log are suitable for updating the artificial intelligence model.

The processor 180 may determine the suitability of the input data and the feedback by using at least one of a plurality of suitability determination methods. In addition, if the processor determines suitability using a plurality of suitability determination methods, the processor 180 may determine suitability of the input data and feedback based on a suitability determination ratio for the plurality of suitability determination results. A detailed description of the plurality of suitability determination methods will be described later.

As a result of the determination in step S707, if the input data and the feedback are determined to be data unsuitable for updating the artificial intelligence model, the processor 180 of the artificial intelligence apparatus 100 ends the procedure.

In an embodiment, the processor 180 may end the procedure of generating the training data from the currently received input data and the feedback corresponding thereto and may repeat the procedure of receiving the new input data to generate the training data.

As a result of the determination in step S707, if it is determined that the input data and the feedback are data suitable for updating the artificial intelligence model, the processor 180 of the artificial intelligence apparatus 100 generates the training data based on the input data and the feedback (S709).

The processor 180 may generate training data including the input data determined to be suitable for updating the artificial intelligence model and the feedback as label information corresponding thereto.

In addition, the processor 180 of the artificial intelligence apparatus 100 updates the artificial intelligence model by using the training data (S711).

Updating the artificial intelligence model using the training data may mean updating the model parameters of the artificial intelligence model by further learning the artificial intelligence model using the training data.

In an embodiment, the processor 180 of the artificial intelligence apparatus 100 may update the artificial intelligence model stored in the memory 170 either directly or through the learning processor 140.

In one embodiment, the processor 180 of the artificial intelligence apparatus 100 transmits the artificial intelligence model and the generated training data to the artificial intelligence server 200 through the communication interface 110, and the processor 260 of the artificial intelligence server 200 or the learning processor 240 updates the received artificial intelligence model using the received training data, and the processor 180 of the artificial intelligence apparatus 100 may receive the updated artificial intelligence model from the artificial intelligence server 200 through the communication interface 110.

In one embodiment, the processor 180 of the artificial intelligence apparatus 100 transmits the generated training data to the artificial intelligence server 200 through the communication interface 110, and the processor 260 of the artificial intelligence server 200 or the learning processor 240 may update the artificial intelligence model stored in the memory 230 by using the received training data.

Although FIG. 7 illustrates only an example in which the artificial intelligence apparatus 100 determines whether input data and feedback are suitable for updating an artificial intelligence model, the present disclosure is not limited thereto. In other words, in another embodiment, the artificial intelligence apparatus 100 may transmit input data and feedback corresponding thereto to the artificial intelligence server 200 and determine whether the input data and feedback received by the artificial intelligence server 200 is suitable for updating the artificial intelligence model. Therefore, even if only the operation of the artificial intelligence apparatus 100 is described in the description of the drawings to be described later, it should be understood that the artificial intelligence server 200 can perform the same operation as the artificial intelligence apparatus 100.

Steps illustrated in FIG. 7 may be performed repeatedly, and accordingly, the artificial intelligence apparatus 100 may repeatedly generate training data for using an update of an artificial intelligence model from input data and feedback.

The order of the steps illustrated in FIG. 7 is merely an example, and the present disclosure is not limited thereto. In other words, in one embodiment, the order of some of the steps illustrated in FIG. 7 may be interchanged. In addition, in one embodiment, some of the steps illustrated in FIG. 7 may be performed in parallel.

Figure 8:
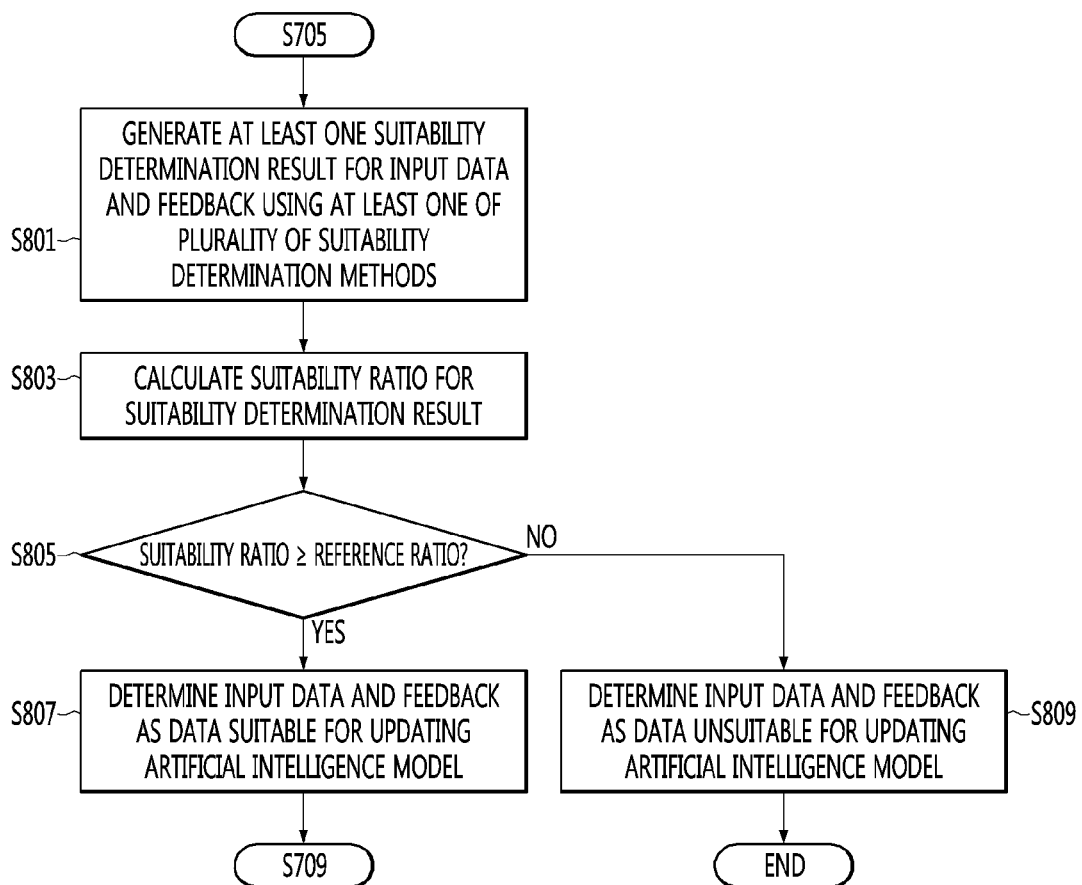
FIG. 8 is a flowchart illustrating an example of a step S707 of determining suitability of input data and feedback for updating the artificial intelligence model illustrated in FIG. 7.

FIG. 8 is a flowchart illustrating an example of a step S707 of determining suitability of input data and feedback for updating the artificial intelligence model illustrated in FIG. 7.

Referring to FIG. 8, the processor 180 of the artificial intelligence apparatus 100 generates at least one suitability determination results for input data and feedback using at least one of a plurality of suitability determination methods (S801).

The processor 180 may determine the suitability of the input data and the feedback for updating the artificial intelligence model by using at least one of the plurality of predetermined suitability determination methods and generate the suitability determination result by the number of the used suitability determination methods. For example, if the processor 180 determines the suitability of the input data and the feedback using a total of four suitability determination methods, a total of four suitability determination results may be generated.

In addition, the processor 180 of the artificial intelligence apparatus 100 calculates a suitability determination ratio (suitability ratio) for the suitability determination result (S803).

The processor 180 may calculate a ratio of the input data and the feedback among the generated at least one suitability determination result determined to be suitable for updating the artificial intelligence model. For example, four suitability determination results were generated by determining suitability of input data and feedback using a total of four suitability determination methods, and if only two determination results of four suitability determination results indicate the data being suitable for updating the artificial intelligence model, the processor 180 may calculate a suitability determination ratio as 0.5 or 50%.

In addition, the processor 180 of the artificial intelligence apparatus 100 determines whether the suitability determination ratio is equal to or greater than a reference ratio (S805).

The reference ratio may mean how much of a plurality of suitability determination results is sufficient to indicate a suitability result. For example, if the reference ratio is 100%, it is required that all the plurality of suitability determination results are suitable. Similarly, if the reference ratio is 50%, it is required whether half or more of the plurality of suitability determination results are suitable.

The reference ratio may be a predetermined value or may be a value determined by user input. The reference ratio may be determined independently of the number of used suitability determination methods but may be determined dependent on the number of used conformity determination methods.

As a result of the determination in step S805, if the suitability determination ratio is equal to or greater than the reference ratio, the processor 180 of the artificial intelligence apparatus 100 determines input data and feedback as data suitable for updating the artificial intelligence model (S807) and proceeds to step S709 of generating training data.

The processor 180 may determine that the input data and the feedback are data suitable for updating the artificial intelligence model if the suitability determination ratio for the plurality of suitability determination results is equal to or greater than the reference ratio. For example, if the reference ratio is 100%, the processor 180 can determine that the input data and feedback are data suitable for updating the artificial intelligence model if the suitability determination results according to the plurality of suitability determination methods used for the suitability determination are all suitable. For example, if the reference ratio is 50%, the processor 180 can determine input data and feedback as data suitable for updating the artificial intelligence model if half or more of the suitability determination results according to the plurality of suitability determination methods used for the suitability determination are suitable.

As a result of the determination in step S805, if the suitability determination ratio is less than the reference ratio, the processor 180 of the artificial intelligence apparatus 100 determines input data and feedback as data unsuitable for updating the artificial intelligence apparatus (S809) and ends the procedure.

The order of the steps illustrated in FIG. 8 is merely an example, and the present disclosure is not limited thereto. In other words, in an embodiment, the order of some of the steps illustrated in FIG. 8 may be interchanged. In addition, in one embodiment, some of the steps illustrated in FIG. 8 may be performed in parallel.

Figure 9:
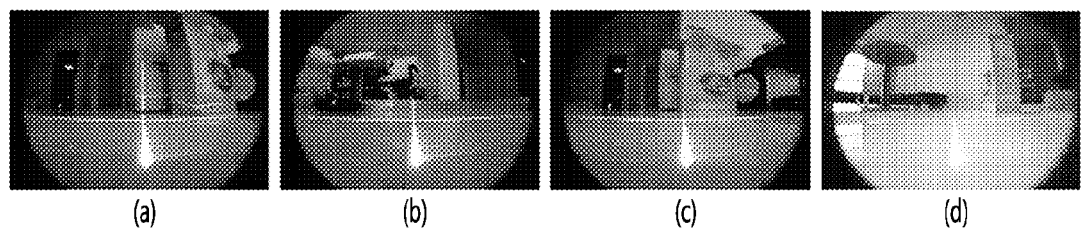
FIG. 9 is a view illustrating examples of data unsuitable for updating an artificial intelligence model according to an embodiment of the present disclosure.

FIG. 9 is a view illustrating examples of data unsuitable for updating an artificial intelligence model according to an embodiment of the present disclosure.

FIG. 9 illustrates four images captured by the artificial intelligence apparatus 100 as a robot cleaner including a camera 121. The artificial intelligence apparatus 100 may obtain image data through the camera 121, recognize obstacles around the artificial intelligence apparatus to set a driving route, and drive based on the set driving route.

Referring to FIG. 9, there are no obstacles that will hinder driving in the images obtained by the artificial intelligence apparatus 100. However, if the artificial intelligence device 100 is caught in an invisible object (for example, a fishing line) and cannot drive, the artificial intelligence apparatus 100 may obtain feedback which fails to drive through the sensor information collected by the sensor unit 140. In this case, since the artificial intelligence apparatus 100 obtains feedback that the driving has failed even if the image data as the input data does not include the obstacle, the artificial intelligence apparatus 100 may map incorrectly labels that an obstacle that hinders the driving is included to the input data. If the artificial intelligence apparatus 100 generates the training data based on the input data and the wrong feedback to update the artificial intelligence model, the artificial intelligence model may be incorrectly learned to lower the obstacle recognition accuracy.

Figure 10:
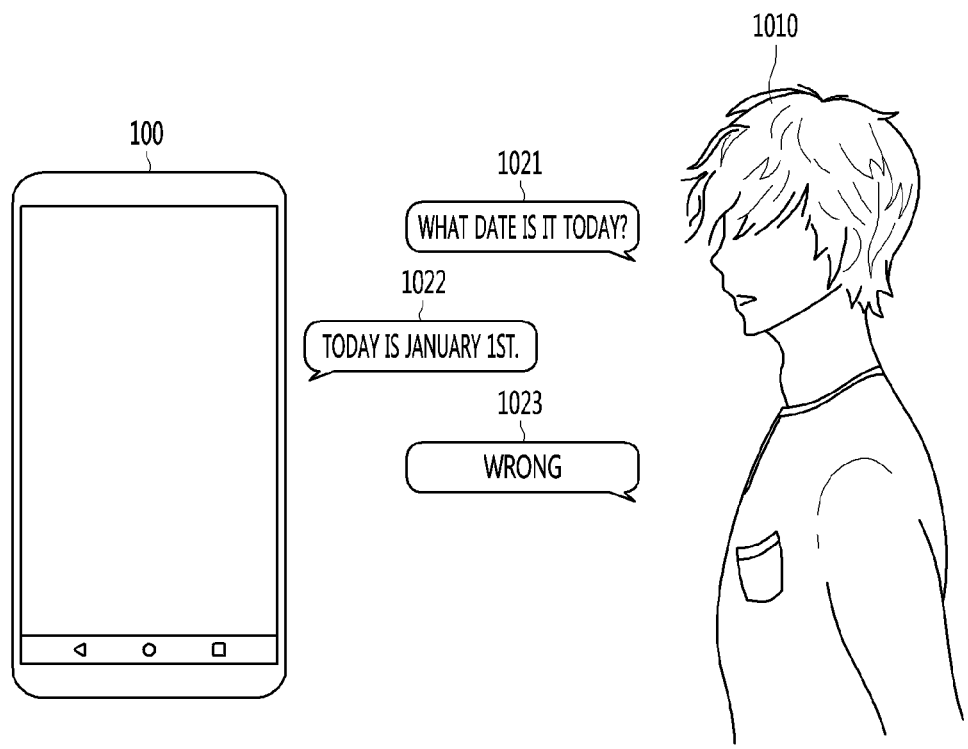
FIG. 10 is a view illustrating an example of data unsuitable for updating an artificial intelligence model according to an embodiment of the present disclosure.

FIG. 10 a view illustrating an example of data unsuitable for updating an artificial intelligence model according to an embodiment of the present disclosure.

FIG. 10 illustrates a process of interaction between the user 1010 and the artificial intelligence apparatus 100 as a smart speaker or smartphone including a microphone 122. The artificial intelligence apparatus 100 can obtain the voice data of the user 1010 through the microphone 122 to determine the user's utterance intention and output the response corresponding to the utterance intention determined through the display 151, the audio output interface 152, or the like.

Referring to FIG. 10, the user 1010 may utter a query such as "what date is it today?" 1021 and query "today's date" to the artificial intelligence apparatus 100, and the artificial intelligence apparatus 100 may grasp that the intention of the user 1010 is "a query about the date of today" based on the received voice data and output a response such as "today is January 1st" 1022. However, although the artificial intelligence apparatus 100 has responded correctly, the user 1010 may provide wrong feedback, such as intentionally or accidentally "wrong" 1023. In this case, although the artificial intelligence apparatus 100 correctly grasp that the intention of the voice data 1021 as the input data was "a query about the date of today", since the artificial intelligence apparatus 100 has obtained feedback of a wrong response, the artificial intelligence apparatus 100 may map a label that the intention for the input data is not "a query about the date of today". If the artificial intelligence apparatus 100 generates training data based on the input data and the wrong feedback and updates the artificial intelligence model, the artificial intelligence model may be incorrectly learned to lower the voice recognition accuracy.

Figure 11:
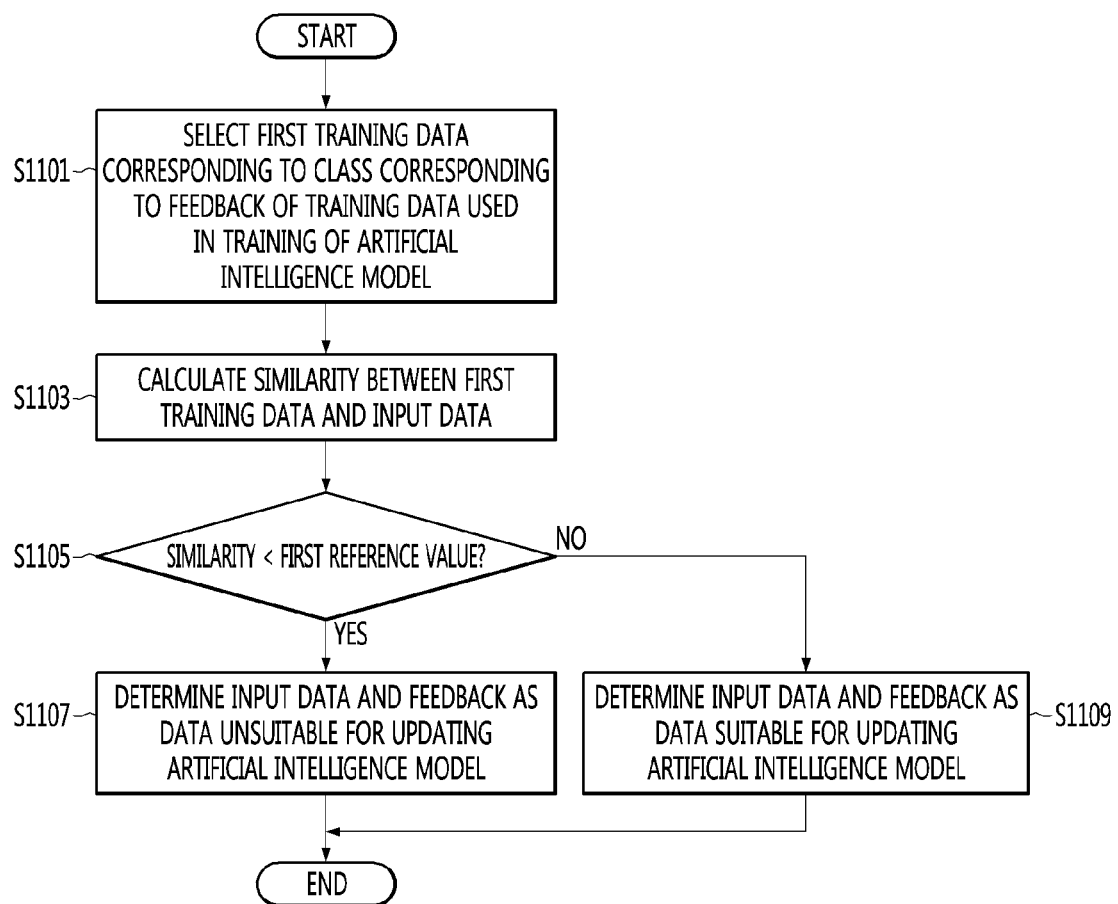
FIG. 11 is a flowchart illustrating a first suitability determination method according to an embodiment of the present disclosure.

FIG. 11 is a flowchart illustrating a first suitability determination method according to an embodiment of the present disclosure.

Referring to FIG. 11, the first suitability determination method according to an embodiment of the present disclosure may be a method which determines whether the input data is an outlier and, if the input data is determined as the outlier, determines the input data and feedback as data unsuitable for updating the artificial intelligence model.

In detail, the processor 180 of the artificial intelligence apparatus 100 selects first training data corresponding to a class corresponding to the feedback of the training data used to learn the artificial intelligence model (S1101).

The artificial intelligence model may be a classification model for outputting a class corresponding to the input data, and thus, the training data used for learning the artificial intelligence model may be classified for each corresponding class. If the artificial intelligence apparatus 100 generates the training data based on the input data and the feedback corresponding thereto, the generated training data becomes training data for recognizing a class corresponding to the feedback. Accordingly, the processor 180 may select first training data corresponding to a class corresponding to the feedback of the existing training data to determine whether the input data is an outlier for a class corresponding to the feedback.

In addition, the processor 180 of the artificial intelligence apparatus 100 calculates similarity between the selected first training data and the input data (S1103).

The processor 180 can map the input data and the selected first training data to the feature space using an artificial intelligence model, calculate a distance between the input data and the first training data on the feature space, and calculate similarity based on the calculated distance. The processor 180 may calculate higher similarity as the calculated distance is short. Herein, the feature space may mean an output feature space or an output space unless otherwise specified.

In addition, the processor 180 of the artificial intelligence apparatus 100 determines whether the calculated similarity is less than the first reference value (S1105).

The first reference value may be a predetermined value, may be a value set by user input, or may be a value that is flexibly changed by training.

As a result of the determination in step S1105, if the calculated similarity is less than the first reference value, the processor 180 of the artificial intelligence apparatus 100 determines the input data and the feedback as data unsuitable for updating the artificial intelligence model (S1107).

If the calculated similarity is less than the first reference value, the input data and the feedback may be regarded as data having a significantly lower similarity compared to the existing training data, and the processor 180 may determine the input data as an outlier. Accordingly, the processor 180 may determine the input data determined as the outlier and the feedback corresponding thereto as data unsuitable for updating the artificial intelligence model.

As a result of the determination in step S1105, if the calculated similarity is equal to or greater than the first reference value, the processor 180 of the artificial intelligence apparatus 100 determines the input data and the feedback as data suitable for updating the artificial intelligence model (S1109).

If the calculated similarity is equal to or greater than the first reference value, the input data and the feedback may be regarded as data having sufficiently high similarity compared to the existing training data, and the processor 180 may determine that the input data is not an outlier. Accordingly, the processor 180 may determine the input data determined not to be the outlier and the feedback corresponding thereto as data suitable for updating the artificial intelligence model.

Although FIG. 11 illustrates an example of selecting first training data of existing training data and calculating similarity between the first training data and the input data, the present disclosure is not limited thereto. In another embodiment, the artificial intelligence apparatus 100 may learn a distribution model for each class using existing training data, and determine whether the input data is an outlier for a class corresponding to the feedback using the learned class distribution model. In this case as well, the artificial intelligence apparatus 100 may calculate the similarity between the input data and the class corresponding to the feedback by using a distribution model for each class and determine whether the calculated similarity is less than the reference value (for example, the first reference value), and thus, the artificial intelligence apparatus 100 can determine whether the input data is an outlier.

In addition, although FIG. 11 illustrates an example of determining whether the input data is an outlier by comparing the similarity between the first training data corresponding to a class corresponding to the feedback of the existing training data and the input data, the present disclosure is not limited thereto. In another embodiment, the artificial intelligence apparatus 100 may generate an inference result corresponding to the input data by using an artificial intelligence model, select the training data corresponding to a class corresponding to the inference result of the existing training data, and compare the similarity between the selected training data and the input data to determine whether the input data is an outlier.

The order of the steps illustrated in FIG. 11 is merely an example, and the present disclosure is not limited thereto. In other words, in an embodiment, the order of some of the steps illustrated in FIG. 11 may be interchanged. In addition, in one embodiment, some of the steps illustrated in FIG. 11 may be performed in parallel.

Figure 12:
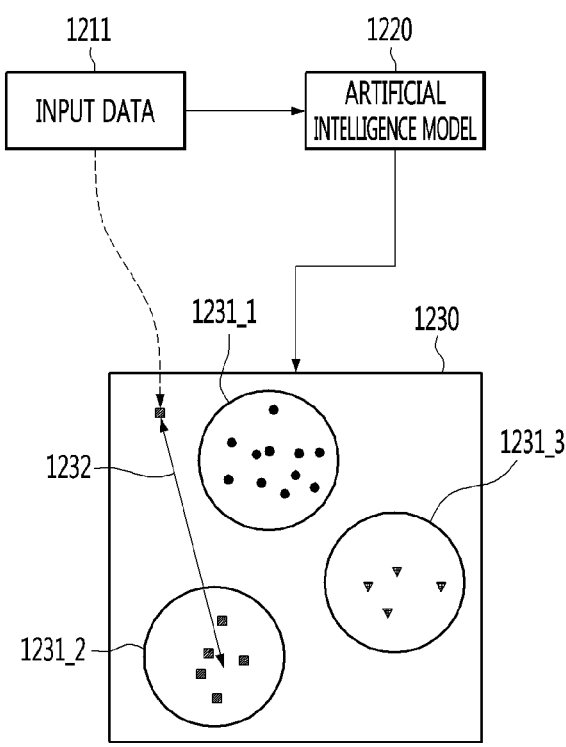
FIG. 12 is a view illustrating the first suitability determination method according to an embodiment of the present disclosure.

FIG. 12 is a view illustrating first suitability determination method according to an embodiment of the present disclosure.

Referring to FIG. 12, if the processor 180 of the artificial intelligence apparatus 100 receives the input data 1211, the processor 180 may map the input data 1211 to the feature space 1230 using the artificial intelligence model 1220. The feature space 1230 may include a first class 1231_1, a second class 1231_2, and a third class 1231_3 classified by learning of the artificial intelligence model 1220.

If the feedback corresponding to the input data 1211 points to the second class 1231_2, the processor 180 may calculate similarity between the training data corresponding to the second class 1231_2 of existing training data used for learning the artificial intelligence model 1220 and the input data 1211. The processor 180 may calculate a distance 1232 between the training data corresponding to the second class 1231_2 in the feature space 1230 and the input data 1211 in the feature space 1230, and calculate the similarity to be high as the calculated distance is short.

In the example of FIG. 12, the input data 1211 mapped to the feature space 1230 is illustrated so that the distance to the second class 1231_2 is remarkably far away, and in this case, the calculated similarity is lower than the preset reference value. Accordingly, the processor 180 may determine the input data 1211 and the feedback corresponding thereto as data unsuitable for updating the artificial intelligence model 1220.

Figure 13:
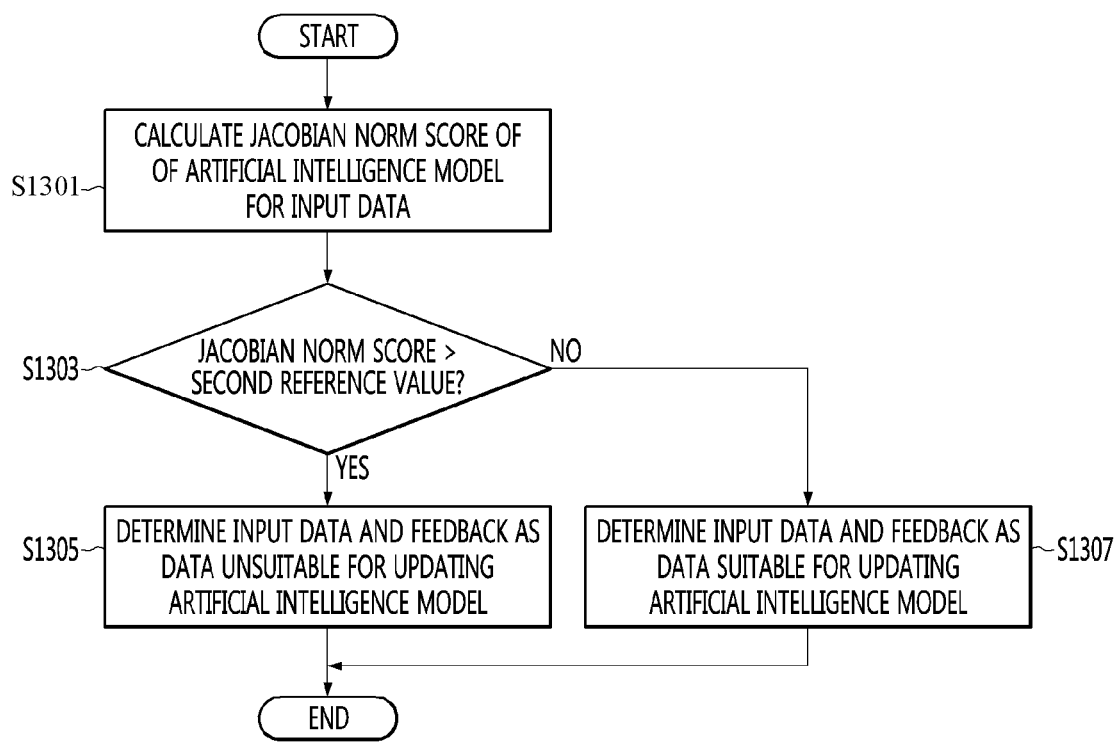
FIG. 13 is a flowchart illustrating a second suitability determination method according to an embodiment of the present disclosure.

FIG. 13 is a flowchart illustrating a second suitability determination method according to an embodiment of the present disclosure.

Referring to FIG. 13, the second suitability determination method according to an embodiment of the present disclosure may be a method which calculates sensitivity of an artificial intelligence model for input data and determines input data and feedback as data unsuitable for updating the artificial intelligence model if the calculated sensitivity exceeds a predetermined level.

In detail, the processor 180 of the artificial intelligence apparatus 100 calculates a Jacobian norm score of an artificial intelligence model for input data (S1301).

The Jacobian norm score may mean expected value of Frobenius Norm of a Jacobian Matrix of the artificial intelligence model for the input data. The Jacobian norm score is an indicator of how sensitive the artificial intelligence model is to the input data, and the high Jacobian norm score means that it is expected that the artificial intelligence model will generate large perturbations in the resulting value even with small perturbations near the input data. In other words, it is highly likely that the inference result generated by the artificial intelligence model is inaccurate with respect to the input data having a high Jacobian norm score.

The processor 180 of the artificial intelligence apparatus 100 determines whether the calculated Jacobian norm score is greater than the second reference value (S1303).

Since it can mean that the smaller the Jacobian norm score, the lower the sensitivity of the artificial intelligence model for the input data, it can be regarded that the input data can stably obtain the result from the artificial intelligence model. Accordingly, the processor 180 may determine whether the calculated Jacobian norm score is less than the second reference value, thereby determining whether the input data is stable data suitable for updating the artificial intelligence model.

The second reference value may be a predetermined value, may be a value set by user input, or may be a value flexibly changed by learning.

In addition, although the second reference value may be set identically for all classes, the second reference value may be set separately for each class. According to an embodiment of the present disclosure, the processor 180 may determine whether the calculated Jacobian norm score is less than a second reference value corresponding to a class corresponding to the feedback.

As a result of the determination in step S1303, if the calculated Jacobian norm score is greater than the second reference value, the processor 180 of the artificial intelligence apparatus 100 determines the input data and the feedback as data unsuitable for updating the artificial intelligence model (S1305).

If the calculated Jacobian norm score is greater than the second reference value, it can be regarded that the artificial intelligence model has a significantly high sensitivity for the input data. Accordingly, the processor 180 may determine that the input data of which the Jacobian norm score is greater than the second reference value and the feedback corresponding thereto as data unsuitable for updating the artificial intelligence model.

As a result of the determination in step S1303, if the calculated Jacobian norm score is equal to or less than the second reference value, the processor 180 of the artificial intelligence apparatus 100 determines the input data and the feedback as data suitable for updating the artificial intelligence model (S1307).

If the calculated Jacobian norm score is equal to or less than the second reference value, it can be regarded that the artificial intelligence model has a sufficiently low sensitivity to the input data. Accordingly, the processor 180 may determine the input data of which the Jacobian norm score is equal to or less than the second reference value and the feedback corresponding thereto as the data suitable for updating the artificial intelligence model.

The order of the steps illustrated in FIG. 13 is merely an example, and the present disclosure is not limited thereto. In other words, in one embodiment, the order of some of the steps illustrated in FIG. 13 may be interchanged. In addition, in one embodiment, some of the steps illustrated in FIG. 13 may be performed in parallel.

Figure 14:
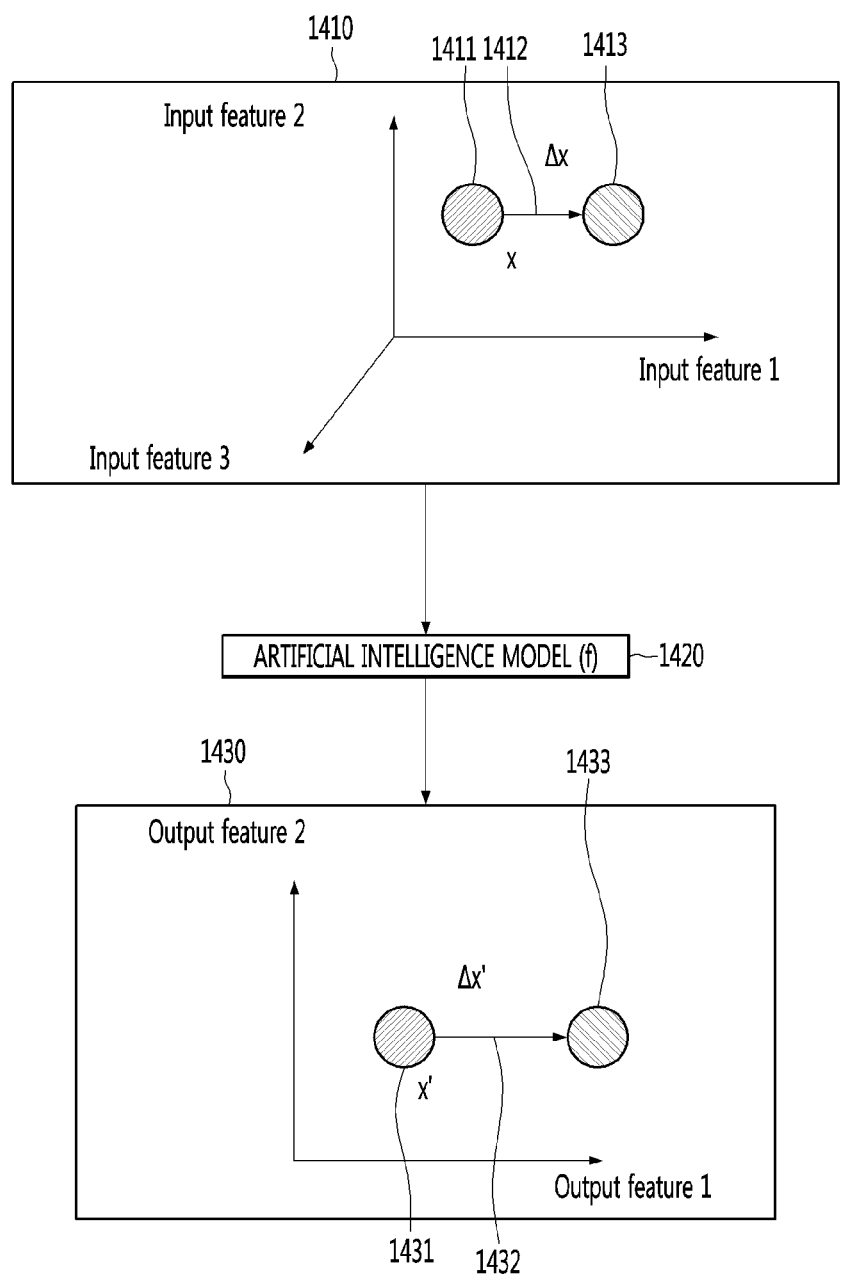
FIG. 14 is a view illustrating a Jacobian norm score according to an embodiment of the present disclosure.

FIG. 14 is a view illustrating a Jacobian norm score according to an embodiment of the present disclosure.

Referring to FIG. 14, the artificial intelligence model 1420 may be regarded as a function f from the input feature space 1410 to the output feature space 1430. The first input data x 1411 on the input feature space 1410 is mapped to the first output data 1431 on the output feature space 1430 through the artificial intelligence model 1420, and the second input data 1412 on the input feature space 1410 may be mapped to the second output data 1432 on the output feature space 1430 through the artificial intelligence model 1420. The second input data 1413 is data in which a small change (small perturbation) is added to the first input data 1411.

The second input data 1413 is different from the first input data x 1411 on the input feature space 1410 by Δx 1412, and the second output data 1433 is different from the first output data x' 1431 on the output feature space 1430 by Δx' 1432. If the artificial intelligence model 1420 is represented by f, the first output data x' 1431 can be expressed as f(x), and Δx' 1432 can be expressed as f(x+Δx)−f(x).

Compared to the difference Δx 1412 on the input feature space 1410, as the difference Δx' 1432 on the output feature space 1430 appears to be greater, the sensitivity to the first input data 1411 of the artificial intelligence model 1420 may be calculated even higher.

Equation 1 below illustrates an example of a method for calculating a Jacobian norm score (JN score). J may be a Jacobian matrix of the artificial intelligence model 1420, $x_{test}$ may be input data, Δx may be input perturbation, and f may be an output for the artificial intelligence model 1420.

$$\text{JN score} = \mathbb{E}_{x_{test}}[\|J(x_{test})\|_F] \approx \mathbb{E}_{\Delta x}[\|f(x_{test}) - f(x_{test} + \Delta x)\|_2^2]$$ [Equation 1]

Figure 15:
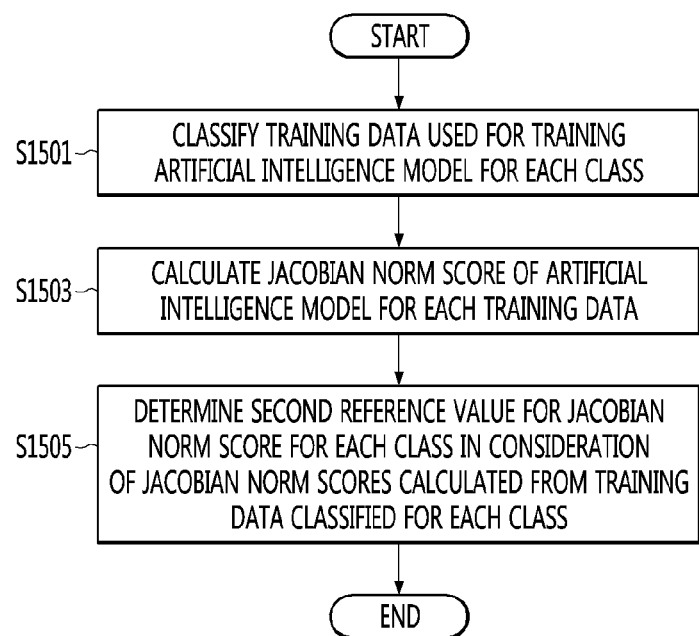
FIG. 15 is a flowchart illustrating a method for determining a second reference value for a Jacobian norm score for each class according to an embodiment of the present disclosure.

FIG. 15 is a flowchart illustrating a method of determining a second reference value for a Jacobian norm score for each class according to an embodiment of the present disclosure.

Referring to FIG. 15, the processor 180 of the artificial intelligence apparatus 100 classifies training data used for learning an artificial intelligence model for each class (S1501).

In addition, the processor 180 of the artificial intelligence apparatus 100 calculates the Jacobian norm score of the artificial intelligence model for each training data (S1503).

The processor 180 may calculate a Jacobian norm score for each training data using an artificial intelligence model learned using the training data.

In addition, the processor 180 of the artificial intelligence apparatus 100 determines the second reference value to the Jacobian norm score for each class in consideration of the Jacobian norm scores calculated from the training data classified for each class (S1505).

The processor 180 may determine a second reference value for the Jacobian norm score for each class in consideration of the average, maximum value, minimum value, median value, or the like of the Jacobian norm scores calculated from the training data classified for each class.

For example, the first training data, the second training data, and the third training data are training data corresponding to the first class, and it is assumed that the Jacobian norm score of the artificial intelligence model for the first training data is 1, the Jacobian norm score of the artificial intelligence model for the second training data is 1.5, and the Jacobian norm score of the artificial intelligence model for the third training data is 0.5. In this case, since the maximum value of the Jacobian norm score calculated from the three training data corresponding to the first class is 1.5, the processor 180 sets the second reference value for the Jacobian norm score corresponding to the first class as 1.5 or a value larger than 1.5 by a predetermined degree.

As such, the artificial intelligence apparatus 100 may determine a second reference value for the different Jacobian norm scores from each other for each class, and accordingly determine whether the input data is data suitable for updating the artificial intelligence model based on different criteria for each class.

The order of the steps illustrated in FIG. 15 is merely an example, and the present disclosure is not limited thereto. In other words, in some embodiments, the order of some of the steps illustrated in FIG. 15 may be interchanged. In addition, in one embodiment, some of the steps illustrated in FIG. 15 may be performed in parallel.

Figure 16:
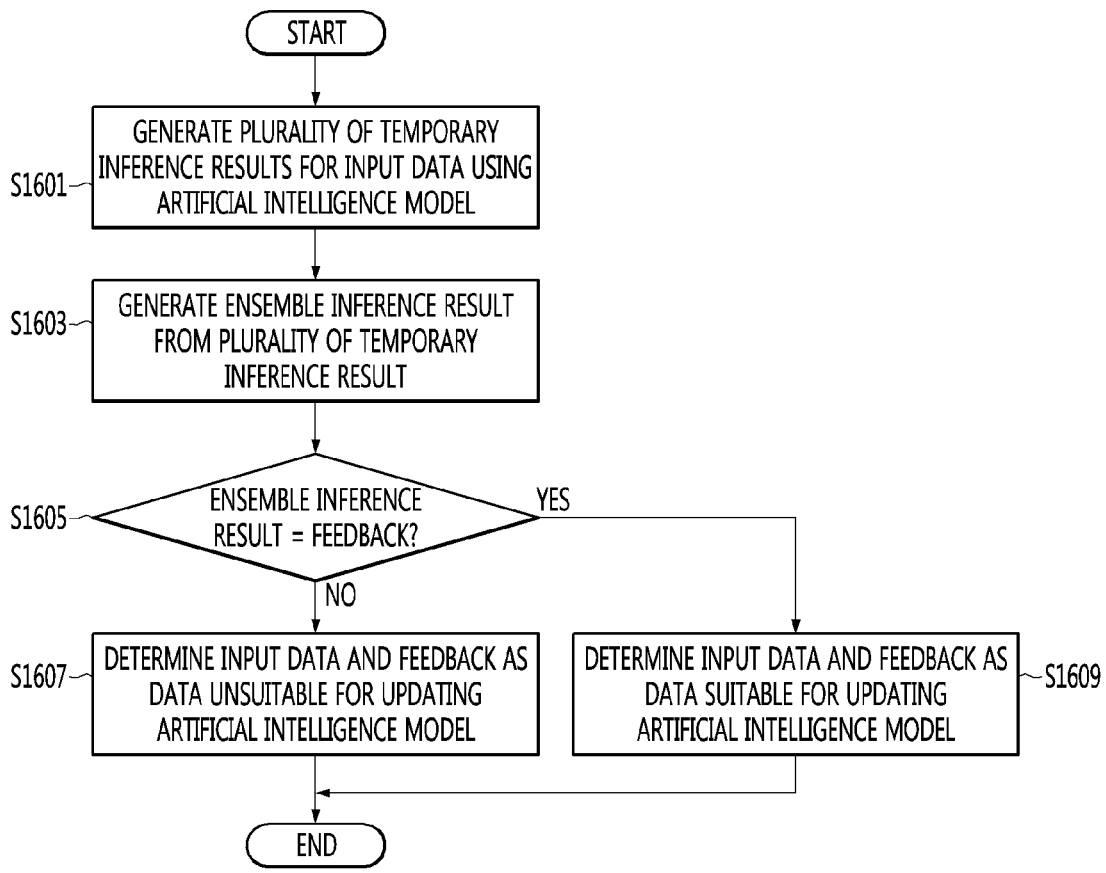
FIG. 16 is a flowchart illustrating a third suitability determination method according to an embodiment of the present disclosure.

FIG. 16 is a flowchart illustrating a third suitability determination method according to an embodiment of the present disclosure.

Referring to FIG. 16, a third suitability determination method according to an embodiment of the present disclosure may be a method which generates a plurality of temporary inference results to input data using an artificial intelligence model, generates an ensemble inference result from the generated plurality of temporary inference results, and if the feedback corresponding to the input data and the ensemble inference result do not coincide with each other, determines the input data and the feedback as data unsuitable for updating the artificial intelligence model.

In detail, the processor 180 of the artificial intelligence apparatus 100 generates a plurality of temporary inference results of the input data using the artificial intelligence model (S1601).

In an embodiment, the processor 180 may apply a dropout to the artificial intelligence model to generate a temporary inference result corresponding to the input data while deactivating any node.

In another embodiment, the processor 180 may generate a temporary inference result corresponding to the input data by using the temporary artificial intelligence model that has partially changed the hyperparameters in contrast to the artificial intelligence model. To this end, the processor 180 may learn a temporary artificial intelligence model in which hyperparameters are partially changed in contrast to the artificial intelligence model.

In addition, the processor 180 of the artificial intelligence apparatus 100 generates an ensemble inference result from the plurality of temporary inference results (S1603).

The processor 180 may generate a temporary inference result having the highest frequency among the plurality of temporary inference results as the ensemble inference result. For example, if there are 50 temporary inference results corresponding to the first class, 30 temporary inference results corresponding to the second class, and 20 temporary inference results corresponding to the third class, of 100 temporary inference results, the processor 180 may generate an ensemble inference result as an inference result corresponding to the first class.

In addition, the processor 180 of the artificial intelligence apparatus 100 determines whether the ensemble inference result matches the feedback (S1605).

Determining whether the ensemble inference result matches the feedback may mean determining whether the class corresponding to the ensemble inference result matches a class corresponding to the feedback.

As a result of the determination in step S1605, if the ensemble inference result does not match the feedback, the processor 180 of the artificial intelligence apparatus 100 determines the input data and the feedback as data unsuitable for updating the artificial intelligence model (S1607).

If the ensemble inference result derived from the plurality of temporary inference results and the feedback do not match each other, since it may be regarded that the feedback is wrong, the processor 180 may determine the input data and the feedback as data unsuitable for updating the artificial intelligence model.

As a result of the determination in step S1605, if the ensemble inference result matches the feedback, the processor 180 of the artificial intelligence apparatus 100 determines the input data and the feedback as data suitable for updating the artificial intelligence model (S1609).

If the feedback matches the ensemble inference result derived from the plurality of temporary inference results, since it may be regarded that the feedback is not wrong, the processor 180 may determine the input data and the feedback as data suitable for updating the artificial intelligence model.

The order of the steps illustrated in FIG. 16 is merely an example, and the present disclosure is not limited thereto. In other words, in an embodiment, the order of some of the steps illustrated in FIG. 16 may be interchanged. In addition, in one embodiment, some of the steps illustrated in FIG. 16 may be performed in parallel.

Figure 17:
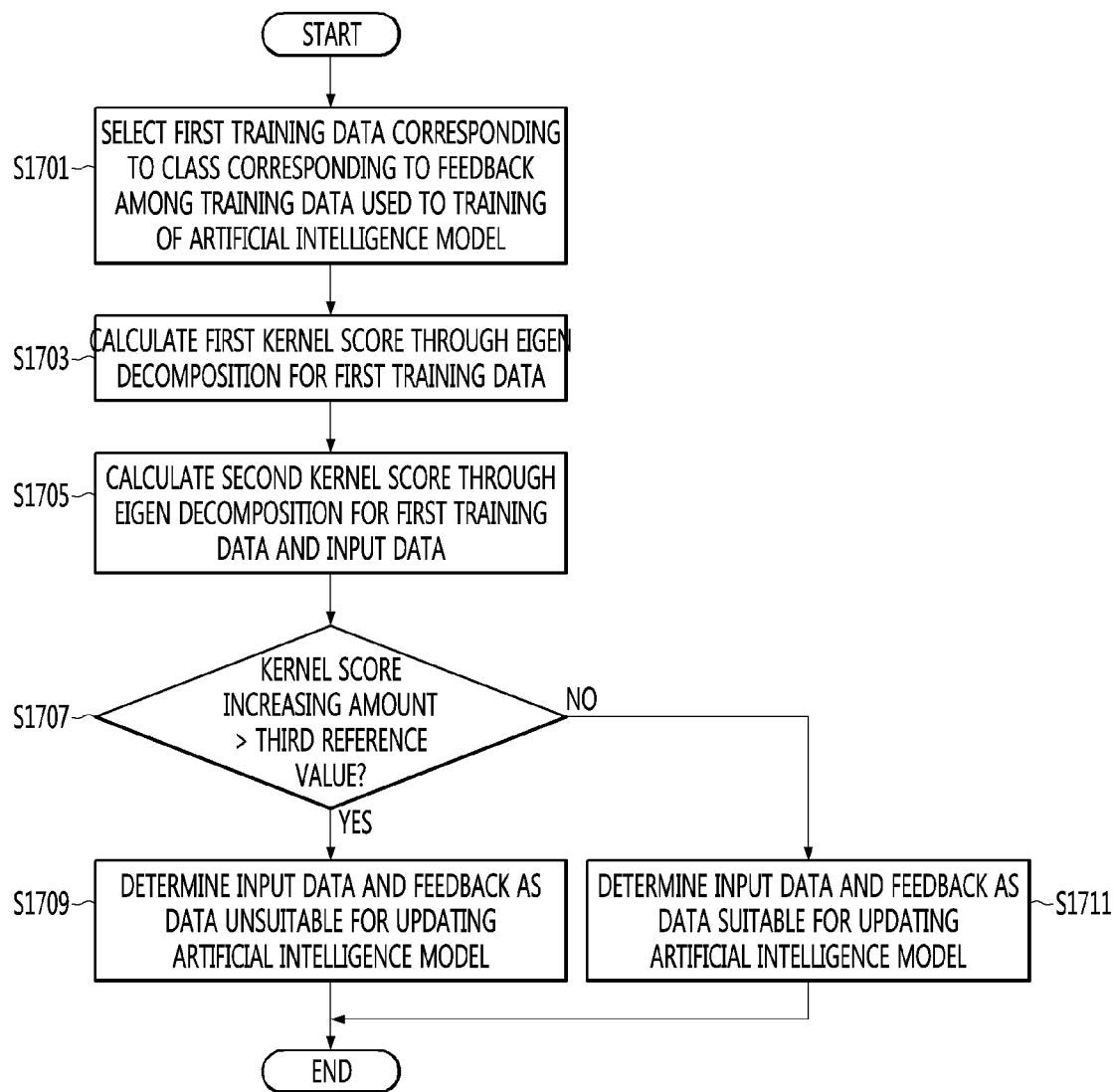
FIG. 17 is a flowchart illustrating a fourth suitability determination method according to an embodiment of the present disclosure.

FIG. 17 is a flowchart illustrating a fourth suitability determination method according to an embodiment of the present disclosure.

Referring to FIG. 17, a fourth suitability determination method according to an embodiment of the present disclosure may be a method which calculates a kernel score of a class corresponding to feedback through kernel analysis and determines whether input data and feedback are data unsuitable for updating artificial intelligence model based on the calculated kernel score.

In detail, the processor 180 of the artificial intelligence apparatus 100 selects first training data corresponding to a class corresponding to the feedback among the training data used to learn the artificial intelligence model (S1701).

The selected first training data does not include input data.

In addition, the processor 180 of the artificial intelligence apparatus 100 calculates a first kernel score through eigen decomposition for the selected first training data (S1703).

The first training data does not include input data and is training data corresponding to a class corresponding to feedback for the input data. The processor 180 may obtain eigenvalues through the eigen decomposition with respect to the first training data and calculate a kernel score based on the obtained eigenvalues.

Equation 2 below is a formula for calculating the kernel score, which is a value obtained by dividing the sum of the obtained eigenvalues by the maximum eigenvalues. If the data are well-scattered, the eigenvalues usually appear large, so the kernel score is yielded to be high up to the upper limit of a number n of the eigenvalues. On the other hand, if the data are not scattered, only a few high eigenvalues appear large, so the kernel score is calculated to be close to 1 so as to be low. In other words, a high kernel score means that the data is well-scattered, whereas a low kernel score means that the data is not scattered.

$$\text{Kernel score} = \frac{\sum_n \text{eigenvalues}_n}{\max_n \text{eigenvalues}_n} \quad \text{[Equation 2]}$$

In addition, the processor 180 of the artificial intelligence apparatus 100 calculates a second kernel score through eigen decomposition for the selected first training data and input data (S1705).

Unlike the step S1703, the processor 180 calculates a second kernel score through eigen decomposition in a state of including the first training data and the input data, and thus the processor 180 can determine whether the distribution of the data in a class corresponding to the feedback is further scattered as the input data is added. In other words, if the second kernel score is calculated to be larger than the first kernel score, it means that the data is further scattered and distributed as input data is added to a class corresponding to the feedback.

In addition, the processor 180 of the artificial intelligence apparatus 100 determines whether the kernel score increasing amount exceeds a third reference value (S1707).

The kernel score increasing amount means an increasing amount from the first kernel score to the second kernel score, and can be calculated by subtracting the first kernel score from the second kernel score. If the increasing amount from the first kernel score to the second kernel score is excessively increased beyond the third reference value, the input data may be regarded as data that does not well follow the distribution of a class corresponding to the feedback, and it may mean that the input data is data unsuitable for updating the artificial intelligence model.

The third reference value may be a predetermined value, may be a value set by user input, or may be a value flexibly changed by training.

As a result of the determination in step S1707, if the kernel score increasing amount is greater than the third reference value, the processor 180 of the artificial intelligence apparatus 100 determines the input data and the feedback as data unsuitable for updating the artificial intelligence model (S1709).

As a result of the determination in step S1707, if the kernel score increasing amount is equal to or less than the third reference value, the processor 180 of the artificial intelligence apparatus 100 determines the input data and the feedback as data suitable for updating the artificial intelligence model (S1711).

The order of the steps illustrated in FIG. 17 is merely an example, and the present disclosure is not limited thereto. In other words, in an embodiment, the order of some of the steps illustrated in FIG. 17 may be interchanged. In addition, in one embodiment, some of the steps illustrated in FIG. 17 may be performed in parallel.

Figure 18:
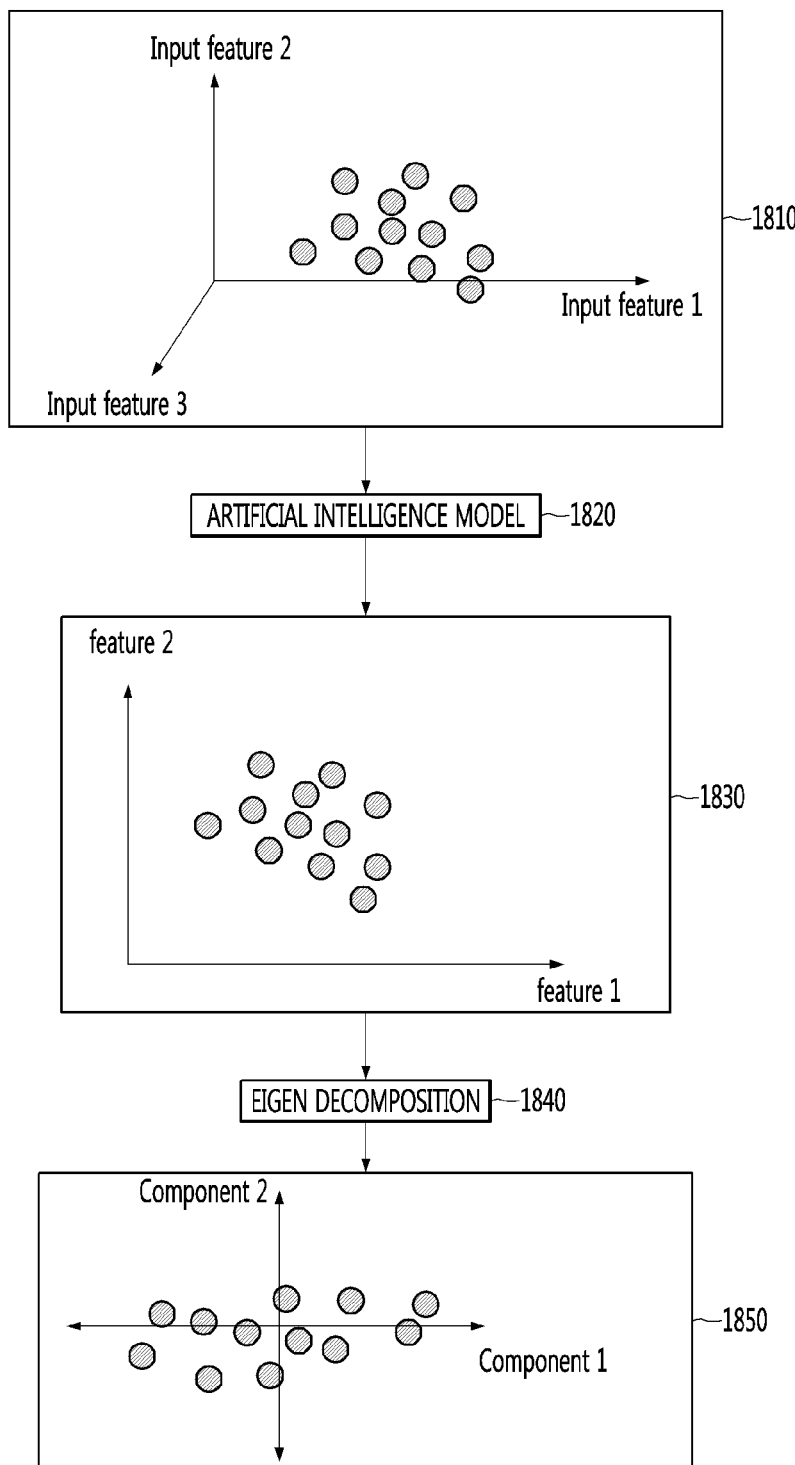

FIGS. 18 and 19 are views illustrating kernel analysis according to an embodiment of the present disclosure.

Referring to FIG. 18, input data in the input feature space 1810 may be mapped to the output feature space 1830 through the artificial intelligence model 1820. Data mapped in the output feature space 1830 may be represented by output features.

The data mapped to the output feature space 1830 may be mapped to the eigen space 1850 through the eigen decomposition 1840. The eigen decomposition 1840 means extracting an eigenvalue and an eigenvector from the data.

Referring to FIG. 19, FIG. 19(*a*) illustrates a situation in which data mapped to eigen space has a strong correlation on some axes (or some eigenvectors), so that data is not scattered. On the other hand, FIG. 19(*b*) illustrates a situation where the data mapped in the eigen space is well scattered regardless of a particular axis (or a specific eigenvector).

In the situation as illustrated in FIG. 19(*a*), since the data in the eigen space has a strong correlation only on some axes, only some of the extracted eigenvalues have large values and some thereof have small values. Thus, the kernel score kernel score is also calculated to be close to 1 so as to be low. On the other hand, even in the situation as illustrated in FIG. 19(*b*), since the data in the eigen space is well distributed, the extracted eigenvalue also has a large value as a whole. Therefore, the kernel score is calculated large as the upper limit of the number n of eigenvalues.

Figure 20:
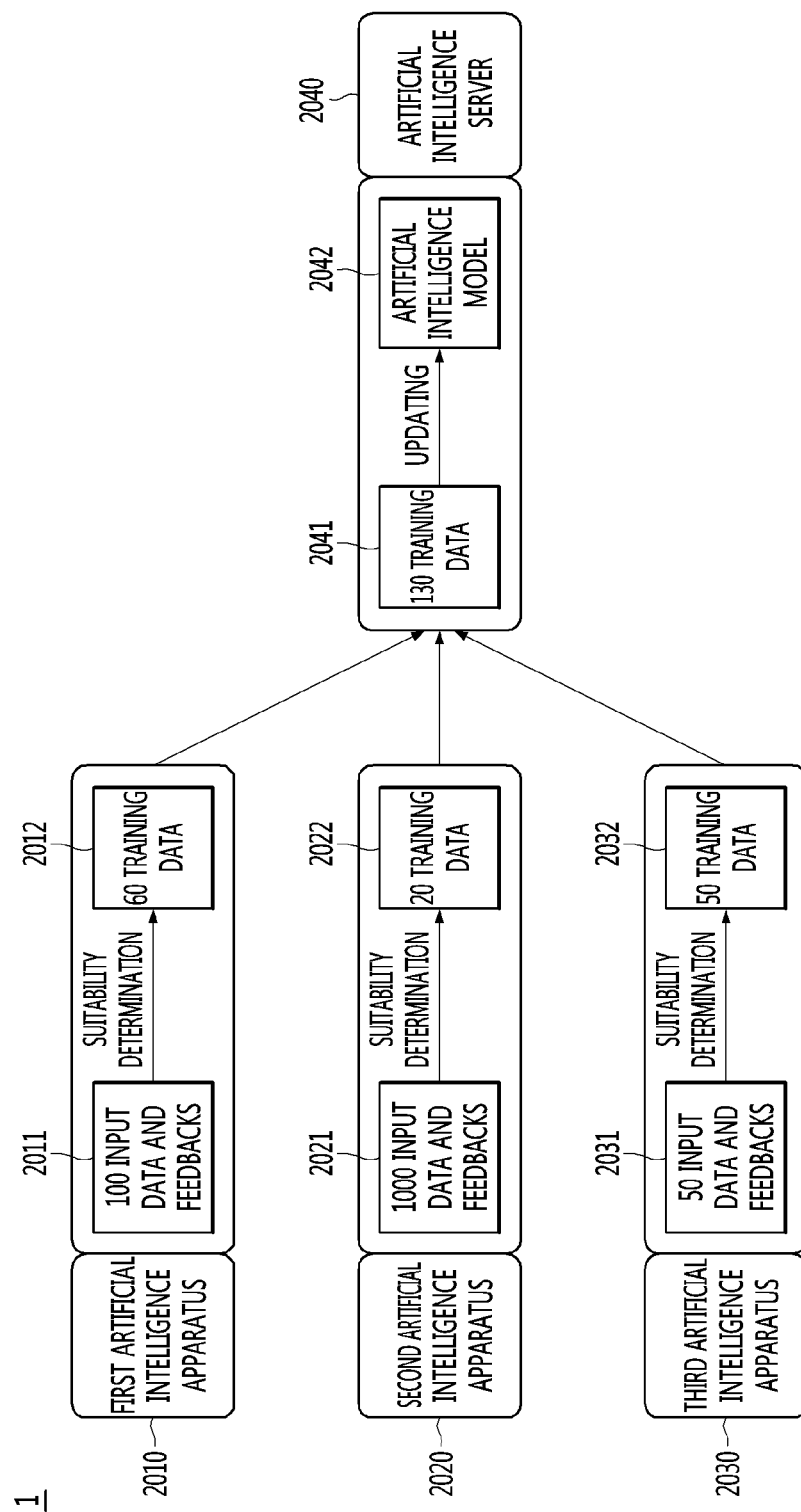
FIG. 20 is a view illustrating an artificial intelligence system for generating training data for an artificial intelligence model according to an embodiment of the present disclosure.

FIG. 20 is a view illustrating an artificial intelligence system 1 for generating training data for an artificial intelligence model, according to an embodiment of the present disclosure.

Referring to FIG. 20, the artificial intelligence system 1 according to an embodiment of the present disclosure may include a plurality of artificial intelligence apparatuses 2010, 2020, and, 2030 and an artificial intelligence server 2040. Each of the artificial intelligence apparatuses 2010, 2020, and 2030 may receive input data and feedback, generate training data by determining suitability for the received input data and feedback, and transmit the generated training data to the artificial intelligence server 2040. The artificial intelligence server 2040 may update the artificial intelligence model 2042 using the received training data 2041.

The first artificial intelligence apparatus 2010 can receive 100 input data and feedback 2011, generate 60 training data 2012 through suitability determination on the received 100 input data and feedback 2011, and transmit the generated 60 training data 2012 to the artificial intelligence server 2040. The second artificial intelligence apparatus 2020 may receive 1000 input data and feedback 2021, generate 20 training data 2022 through suitability determination on the received 1000 input data and feedback 2021, and transmit 20 generated training data 2022 to the artificial intelligence server 2040. The third artificial intelligence apparatus 2030 may receive 50 input data and feedback 2031, generate 50 training data 2032 through suitability determination on the received 50 input data and feedback 2031, and transmit the generated 50 training data 2032 to the artificial intelligence server 2040.

The artificial intelligence server 2040 may update the artificial intelligence model 2042 using the 130 training data 2041 received from the artificial intelligence apparatuses 2010, 2020, and 2030.

Figure 21:
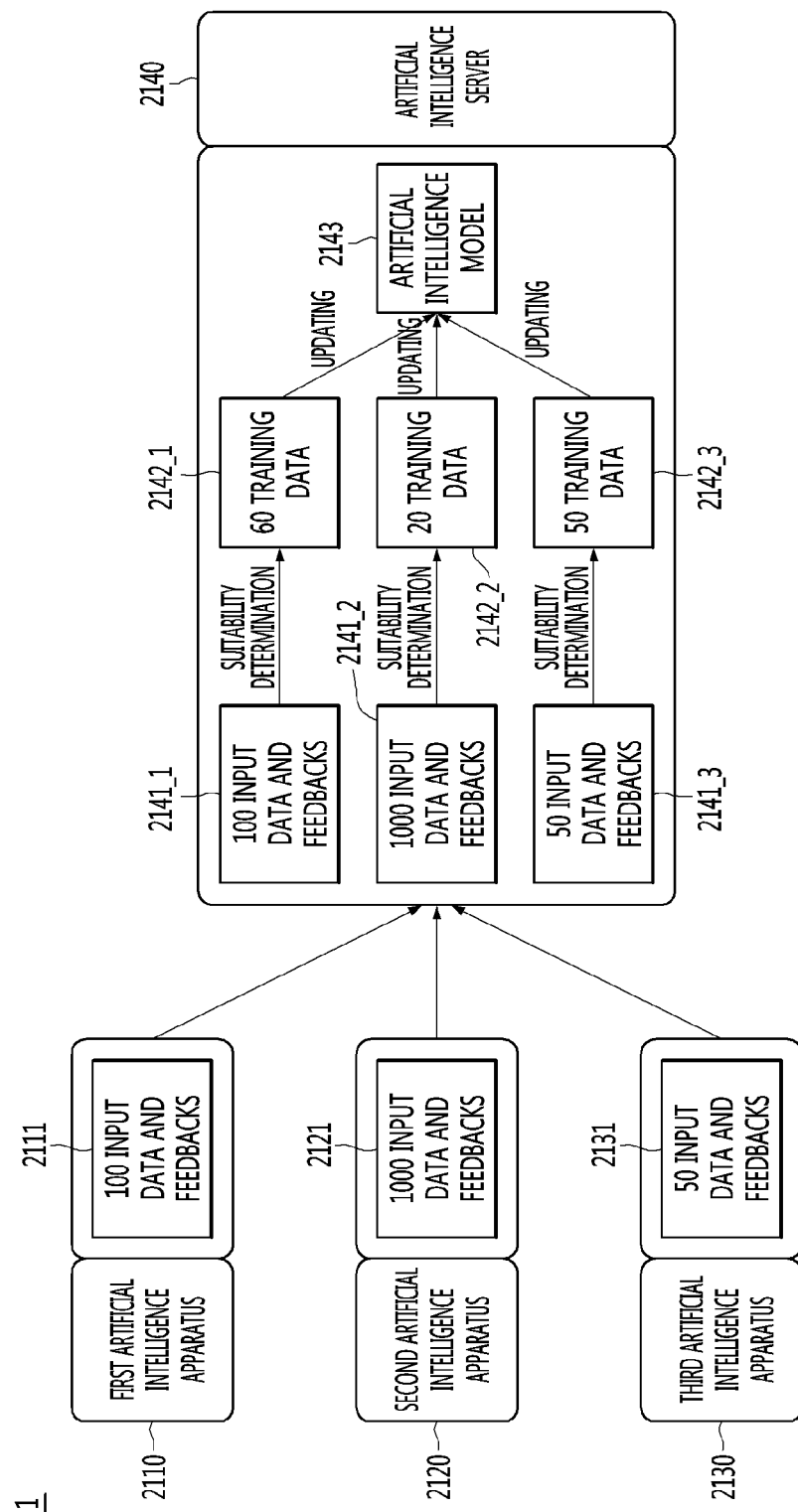
FIG. 21 is a view illustrating an artificial intelligence system for generating training data for an artificial intelligence model according to an embodiment of the present disclosure.

FIG. 21 is a view illustrating an artificial intelligence system 1 for generating training data for an artificial intelligence model, according to an embodiment of the present disclosure.

Referring to FIG. 21, an artificial intelligence system 1 according to an embodiment of the present disclosure may include a plurality of artificial intelligence apparatuses 2110, 2120, and, 2130 and an artificial intelligence server 2140. Each artificial intelligence apparatus 2110, 2120, and 2130 may receive input data and feedback, and transmit the received input data and feedback to the artificial intelligence server 2140. The artificial intelligence server 2140 may generate the training data 2142_1, 2142_2, and 2142_3 through the suitability determination with respect to the received input data and feedbacks 2141_1, 2141_2, and 2141_3, and update the artificial intelligence model 2143 using the generated training data 2142_1, 2142_2, and 2142_3.

The first artificial intelligence apparatus 2110 may receive 100 input data and feedback 2111, and transmit the received 100 input data and feedback 2111 to the artificial intelligence server 2140. The second artificial intelligence apparatus 2120 may receive 1000 input data and feedback 2121, and transmit the generated 1000 input data and feedback 2121 to the artificial intelligence server 2140. The third artificial intelligence apparatus 2130 may receive 50 input data and feedback 2131 and transmit the received 50 input data and feedback 2131 to the artificial intelligence server 2140.

The artificial intelligence server 2140 may generate 60 training data 2142_1 through suitability determination on 100 input data and feedback 2141_1 received from the first artificial intelligence apparatus 2110, generate 20 training data 2142-2 through suitability determination on 1000 input data and feedback 2141_2 received from the second artificial intelligence apparatus 2120, and generate 50 training data 2142_3 through suitability determination on 50 input data and feedback 2141_3 received from the third artificial intelligence apparatus 2130. In addition, the artificial intelligence server 2140 may update the artificial intelligence model 2143 using the generated 130 training data 2142_1, 2142_2, and 2142_3.

In the example of FIGS. 20 and 21, although 1000 data are collected by the second artificial intelligence apparatus 2020 or 2120, only 130 data are suitable for updating the artificial intelligence model. If the unsuitable data is not pre-filtered, the artificial intelligence model may be incorrectly learned and may cause performance degradation.

According to various embodiments of the present disclosure, even if wrong data is accidentally or maliciously generated and collected, it can be prevented the artificial intelligence model from being updated unsuitably by determining in advance whether the collecting data is suitable for updating the artificial intelligence model and excluding data unsuitable for updating the artificial intelligence model.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. An artificial intelligence apparatus for generating training data, comprising:
a memory configured to store an artificial intelligence model;
an input interface including a microphone or a camera; and
a processor configured to:
receive, via the input interface, input data,
generate an inference result corresponding to the input data by using the artificial intelligence model,
receive feedback corresponding to the inference result,
determine suitability of the input data and the feedback for updating the artificial intelligence model, and
generate training data based on the input data and the feedback if the input data and the feedback are determined as data suitable for updating of the artificial intelligence model,
wherein the processor is configured to determine the suitability of the input data and the feedback using at least one of a plurality of suitability determination methods,
wherein the plurality of suitability determination methods include a fourth suitability determination method which determines whether the input data and the feedback are unsuitable for updating the artificial intelligence model based on a kernel score in a class corresponding to the feedback through a kernel analysis, and
wherein the kernel score is a value obtained by dividing the sum of eigenvalues obtained through eigen decomposition by the maximum eigenvalue,
wherein the processor is further configured to:
calculate a first kernel score in a class corresponding to the feedback excluding the input data,
calculate a second kernel score in a class corresponding to the feedback including the input data, and
determine whether the input data and the feedback is suitable based on the first kernel score and the second kernel score.

2. The artificial intelligence apparatus of claim 1, wherein the processor is configured to determine the input data and the feedback as data suitable which updates the artificial intelligence model if a suitability determination ratio to the plurality of suitability determination results according to the plurality of suitability determination methods is equal to or greater than a reference ratio.

3. The artificial intelligence apparatus of claim 1, wherein the plurality of suitability determination methods includes a first suitability determination method for determining the input data and the feedback as data unsuitable for updating the artificial intelligence model if the input data is an outlier, and
wherein the processor is configured to:
if the first suitability determination method is used, calculate similarity between a first training data corresponding to a class corresponding to the feedback among the training data used for the training of the artificial intelligence model and the input data, and determine the input data as an outlier if the similarity is less than a first reference value.

4. The artificial intelligence apparatus of claim 3, wherein the processor is configured to:
if the first suitability determination method is used,
map the input data and the first training data to a feature space by using the artificial intelligence model,
calculate a distance between the input data and the first training data on the feature space, and
calculate the similarity to be high as the calculated distance is short.

5. The artificial intelligence apparatus of claim 1, wherein the plurality of suitability determination methods include a second suitability determination method which determines the input data and the feedback as data unsuitable for updating the artificial intelligence model if the sensitivity of the artificial intelligence model for the input data is greater than a second reference value corresponding to a class corresponding to the feedback.

6. The artificial intelligence apparatus of claim 5, wherein the processor is configured to, if the second suitability determination method is used, calculate a Jacobian Norm Score of the artificial intelligence model for the input data as the sensitivity, and
wherein the Jacobian Norm score is an expected value of Frobenius Norm of the Jacobian matrix of the artificial intelligence model for the input data.

7. The artificial intelligence apparatus of claim 1, wherein the plurality of suitability determination methods includes a third suitability determination method which generates a plurality of temporary inference results to the input data using the artificial intelligence model, generates an ensemble inference result from the plurality of temporary inference results, and determines the input data and the feedback as data unsuitable for updating the artificial intelligence model if the ensemble inference result is inconsistent with the feedback.

8. The artificial intelligence apparatus of claim 7, wherein the processor is configured to:
if the third suitability determination method is used,
apply a dropout to the artificial intelligence model to generate the plurality of temporary inference results, and
generate the temporary inference result having the highest frequency among the plurality of temporary inference results as the ensemble inference result.

9. The artificial intelligence apparatus of claim 1, wherein the processor is configured to:
determine the input data and the feedback as data unsuitable for updating the artificial intelligence model if an increasing amount from the first kernel score to the second kernel score exceeds a third reference value.

10. The artificial intelligence apparatus of claim 1, wherein the feedback includes feedback generated from user input or feedback generated from operation information of the artificial intelligence apparatus.

11. The artificial intelligence apparatus of claim 1, wherein the processor is configured to update the artificial intelligence model using the generated training data.

12. A method for generating training data comprising:
receiving input data through an input interface including a microphone or a camera;

generating an inference result corresponding to the input data using an artificial intelligence model;
receiving feedback corresponding to the inference result;
determining suitability of the input data and the feedback for updating the artificial intelligence model; and
generating training data based on the input data and the feedback if it is determined that the input data and the feedback are suitable for updating the artificial intelligence model,
wherein the determining step includes determining the suitability of the input data and the feedback using at least one of a plurality of suitability determination methods,
wherein the plurality of suitability determination methods include a fourth suitability determination method which determines whether the input data and the feedback are unsuitable for updating the artificial intelligence model based on a kernel score in a class corresponding to the feedback through a kernel analysis, and
wherein the kernel score is a value obtained by dividing the sum of eigenvalues obtained through eigen decomposition by the maximum eigenvalue,
wherein the method further comprises:
    calculate a first kernel score in a class corresponding to the feedback excluding the input data,
    calculate a second kernel score in a class corresponding to the feedback including the input data, and
    determine whether the input data and the feedback are suitable based on the first kernel score and the second kernel score.

13. A non-transitory recording medium having recorded thereon a program for performing a method for generating training data, the method comprising:

receiving input data through an input interface including a microphone or a camera;
generating an inference result corresponding to the input data using an artificial intelligence model;
receiving feedback corresponding to the inference result;
determining suitability of the input data and the feedback for updating the artificial intelligence model; and
generating training data based on the input data and the feedback if it is determined that the input data and the feedback are suitable for updating the artificial intelligence model,
wherein the determining step includes determining the suitability of the input data and the feedback using at least one of a plurality of suitability determination methods,
wherein the plurality of suitability determination methods include a fourth suitability determination method which determines whether the input data and the feedback are unsuitable for updating the artificial intelligence model based on a kernel score in a class corresponding to the feedback through a kernel analysis, and
wherein the kernel score is a value obtained by dividing the sum of eigenvalues obtained through eigen decomposition by the maximum eigenvalue,
wherein the method further comprises:
    calculate a first kernel score in a class corresponding to the feedback excluding the input data,
    calculate a second kernel score in a class corresponding to the feedback including the input data, and
determine whether the input data and the feedback are suitable based on the first kernel score and the second kernel score.

\* \* \* \* \*